(12) United States Patent
Funabashi

(10) Patent No.: US 8,730,260 B2
(45) Date of Patent: May 20, 2014

(54) OBSTACLE INFORMATION NOTIFICATION APPARATUS FOR VEHICLE

(75) Inventor: Junichirou Funabashi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 215 days.

(21) Appl. No.: 13/332,705

(22) Filed: Dec. 21, 2011

(65) Prior Publication Data

US 2012/0206483 A1 Aug. 16, 2012

(30) Foreign Application Priority Data

Dec. 28, 2010 (JP) .................................. 2010-291955
Dec. 7, 2011 (JP) .................................. 2011-268155

(51) Int. Cl.
*G09G 5/00* (2006.01)
*G08G 1/123* (2006.01)

(52) U.S. Cl.
USPC .......................................... 345/619; 340/995

(58) Field of Classification Search
None
See application file for complete search history.

(56) References Cited

U.S. PATENT DOCUMENTS

2005/0278115 A1* 12/2005 Okada ........................... 701/212
2007/0106470 A1* 5/2007 Nakayama et al. ........... 701/211
2007/0229310 A1 10/2007 Sato

FOREIGN PATENT DOCUMENTS

| JP | A-6-265366 | 9/1994 |
|----|------------|--------|
| JP | A-2005-11249 | 1/2005 |
| JP | 2010079805 A * | 4/2010 |
| JP | A-2010-170371 | 8/2010 |

OTHER PUBLICATIONS

Office Action mailed Aug. 20, 2013 in corresponding JP Application No. 2011-268155 (and English translation).

* cited by examiner

*Primary Examiner* — Joni Richer
*Assistant Examiner* — Yi Wang
(74) *Attorney, Agent, or Firm* — Posz Law Group, PLC

(57) ABSTRACT

An in-vehicle obstacle information notification apparatus for displaying an intersection map on a screen of a display section and superimposing a movable body mark on the intersection map when an own vehicle is in an intersection-surrounding area is disclosed. The display section displays the intersection map in a first mode or a second mode. In the first mode, an upper direction of the map is fixed to a given direction, which is determined before the entry into the intersection. In the second mode, the upper direction of the map on the screen is determined based on own vehicle direction, which is changed at a turn at the intersection. Based on information on a movable body in the intersection-surrounding area, the in-vehicle obstacle information notification apparatus determines whether to set the first mode or the second mode as a display mode of the display section.

19 Claims, 19 Drawing Sheets

ACTUAL

NORTH UP

HEADING UP

TARGET UP

ACTUAL

TARGET UP

OBSTACLE INFORMATION NOTIFICATION APPARATUS FOR VEHICLE

CROSS REFERENCE TO RELATED APPLICATION

The present application is based on and claims priority to Japanese Patent Applications No. 2010-291955 filed on Dec. 28, 2010 and No. 2011-268155 filed on Dec. 7, 2011, disclosures of which are incorporated herein by reference.

TECHNICAL FIELD

The present disclosure relates to an obstacle information notification apparatus mounted to a vehicle, particularly to an obstacle information notification apparatus mounted to a vehicle for notifying and displaying a presence of an obstacle around an intersection when the vehicle turns at an intersection.

BACKGROUND

An apparatus known as an in-vehicle obstacle information notification apparatus notifies on-coming vehicle information to a driver when a vehicle makes a turn at an intersection (e.g., Patent Document 1). Patent Document 1 further discloses a conventional technique for informing whether or not a pedestrian is present in a pedestrian crossing that the vehicle is to pass after making the right turn at the intersection.

An apparatus widely known as an in-vehicle navigation apparatus displays a map of a vehicle-traveling road on a display device. Additionally, some well-known in-vehicle navigation apparatuses enable a user to select a heading-up display mode and a north-up display mode for the road map displayed on a screen of the display device. The heading-up display mode is a display mode in which a present heading direction of the vehicle points to a top of the screen. The north-up display mode is a display mode in which north of the map is at the top of the screen.

Furthermore, in another known display mode, an approaching direction to the intersection points to the top of the display screen (e.g., Patent Document 2).
Patent Document 1: JP-2005-11249A1
Patent Document 2: JP-H6-265366A1

According to conventional techniques, in general, the map is fixedly displayed in the display mode that was set by a user. In the case of Patent Document 2, although the display mode of the map is changed depending on a distance to an intersection, the display mode of the map consistently remains the same after the distance to the intersection becomes smaller than a predetermined value.

Now, let us consider a case where obstacle information is displayed on an intersection map to notify the obstacle. The obstacles in this case may include, for example, an on-coming vehicle when the vehicle makes the right turn, a pedestrian in or around the pedestrian crossing that the vehicle is to pass after making the turn at the intersection, and the like. A display form that facilitates a driver's recognition of these obstacles is desirable.

SUMMARY

The present disclosure is made in view of the foregoing. It is an object of the present disclosure to provide an in-vehicle obstacle information notification apparatus that facilitates recognition of an obstacle in a heading direction in an intersection.

According to one example of the present disclosure, an obstacle information notification apparatus mounted to an own vehicle is provided. The obstacle information notification apparatus comprises a display section and a determination section. Based on locating the own vehicle within an intersection-surrounding area, the display section displays an intersection map on a screen and superimposes a movable body mark on the intersection map. The display section is capable of displaying the intersection map in a first mode and a second mode. In the first mode, an upper direction of the intersection map on the screen is fixed to a given direction, the given direction being determined before the own vehicle enters into the intersection. In the second mode, the upper direction of the intersection map on the screen is determined based on own vehicle direction information and is changed when the own vehicle make a turn at the intersection. Based on information on a movable body in the intersection-surrounding area, the determination section determines whether to set the first mode or the second mode as a display mode of the intersection map on the screen of the display section.

According to the above obstacle information notification apparatus mounted to the own vehicle, since the display mode of the intersection map becomes the first mode or the second mode depending on the information on the movable body in the intersection-surrounding area, the intersection map is displayed in an easy-to-understand display form according to actual situations. As a result, it becomes easier to recognize the obstacle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described below with reference to the accompany drawings. The below-described embodiments are direction to regions in which left-hand traffic rule is adopted. When right and left are reversed in the below-described embodiments, embodiments directed to right-hand traffic rule can be obtained.

First Embodiment

Figure 1:
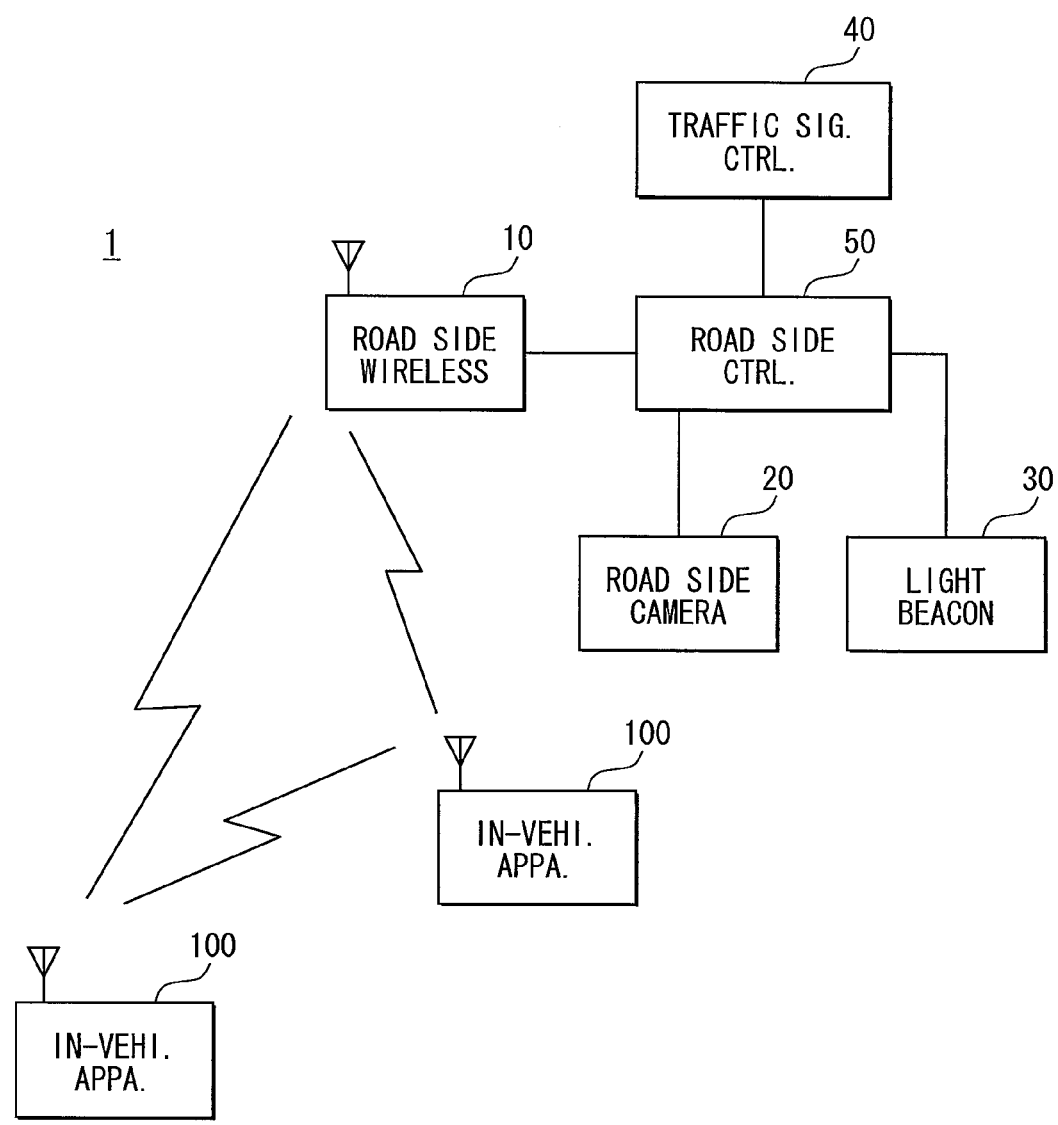
FIG. 1 is a diagram illustrating a configuration of a drive assist system 1 as a whole.

FIG. 1 is a diagram illustrating a configuration of a driving assist system 1 as a whole. As shown in FIG. 1, the driving assist system 1 includes a road side wireless apparatus 10, a road side camera 20, a light beacon 30, a traffic signal lamp control apparatus 40, and a road side controller 50. These are infrastructure-side apparatuses. In addition to these infrastructure-side apparatuses, the driving assist system 1 includes an in-vehicle apparatus 100 mounted to a vehicle.

Figure 2:
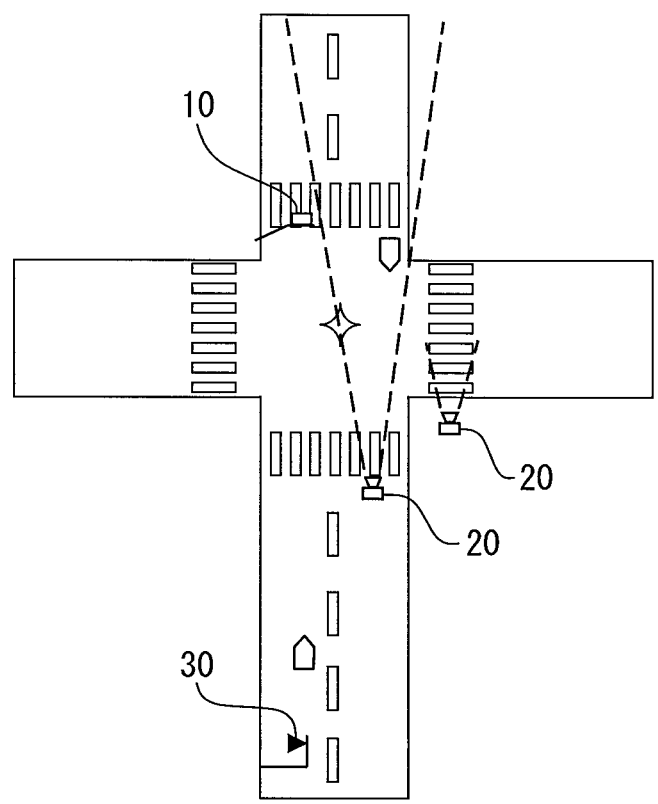
FIG. 2 is a diagram illustrating installation positions of a road side wireless apparatus 10, a road side camera 20 and a light beacon 30 of FIG. 1.

The road side wireless apparatus 10 is installed at a predetermined position in the intersection, more specifically, installed above a pedestrian crossing around the intersection, as shown in FIG. 2. The road side wireless apparatus 10 transmits a variety of intersection information to the surroundings of this intersection by using a radio wave with a predetermined frequency band such as 700 MHz band or a 5.9 MHz band. This intersection information includes traffic signal information, which indicates a signal cycle of a traffic signal at the intersection equipped with the road side wireless apparatus 10. The intersection information further includes information indicating a presence and a position of an obstacle (traveling vehicle and the like) traveling on a road leading to the intersection, information indicating whether or not an obstacle is present in or around the pedestrian crossing around the intersection, and the like.

The road side camera 20 is placed above a road. Specifically, to photograph a vehicle approaching the intersection, the road side camera 20 is placed above a road that is on an opposite side of the intersection from an intersection entry lane. Additionally, a road side camera 20 is placed above the pedestrian crossing in order to photograph the pedestrian crossing around the intersection (see FIG. 2). For illustrative purpose, FIG. 2 illustrates one road side camera 20 above the lane and another road side camera 20 above the pedestrian crossing. In reality, multiple road side cameras 20 may be placed above lanes to photograph multiple roads at the intersection. Furthermore, multiple road side cameras 20 may be placed to photograph multiple pedestrian crossings. These road side cameras 20 and the road side controller 50 are connected in a wired manner. The road side cameras 20 successively output the photographed images.

For each lane, the light beacon 30 is placed above the road. The light beacons 30 may be positioned at various places after the intersection. These light beacons 30 continuously transmit predetermined information toward the vehicles which are traveling on the road. The predetermined information may include a distance to a next intersection, a road shape of the next intersection, traveling road identification information, information on color of the traffic signal at the intersection, and the like. The traveling road identification information is used to identify a road installed with this light beacon 30 from multiple roads intersecting at the intersection (information for identification of one of 4 ways in a case of a 4-way intersection). With use of the traveling road identification information, it is possible to identify on which road the own vehicle is traveling. Road line shape information indicative of a road shape is transmitted from the road side wireless apparatus 10 to the whole soundings of the road side wireless apparatus 10.

The light beacon 30 performs two-way communications with a light beacon antenna 150 of the vehicle. The light beacon 30 can thereby detect that the vehicle has passed below the light beacon 30. The light beacon 30 and the road side controller 50 are connected in the wired manner. When the light beacon 30 detects that the vehicle has passed, the light beacon 30 transmits a signal indicative of this to the road side controller 50. Communications between the road side camera 20 and the road side controller 50 or between the light beacon 30 and the road side controller 50 may be performed in a wireless manner.

In a predetermined order, the traffic signal lamp control apparatus 40 cyclically switches color of the traffic signal at the intersection. The traffic signal lamp control apparatus 40 successively transmits information indicative of the signal color of the traffic signal to the road side controller 50.

The road side controller 50 includes a microcomputer with a CPU, a ROM, a RAM and the like. The CPU executes a program stored in the ROM while using a temporary storage function of the RAM. This road side controller 50 thereby implements an obstacle detection process and an information transmission process. In the obstacle detection process, the road side controller 50 analyzes the image photographed by the road side camera 20, thereby detecting an obstacle traveling on the road to the intersection and an obstacle existing in or around the pedestrian crossing.

In the information transmission process, the road side wireless apparatus 10 successively transmits the position of the obstacle detected in the obstacle detection process, the colors of the traffic signal in predetermined cycles from the present time (e.g., two cycles), a pre-stored road shape of the intersection, and the like.

Figure 3:
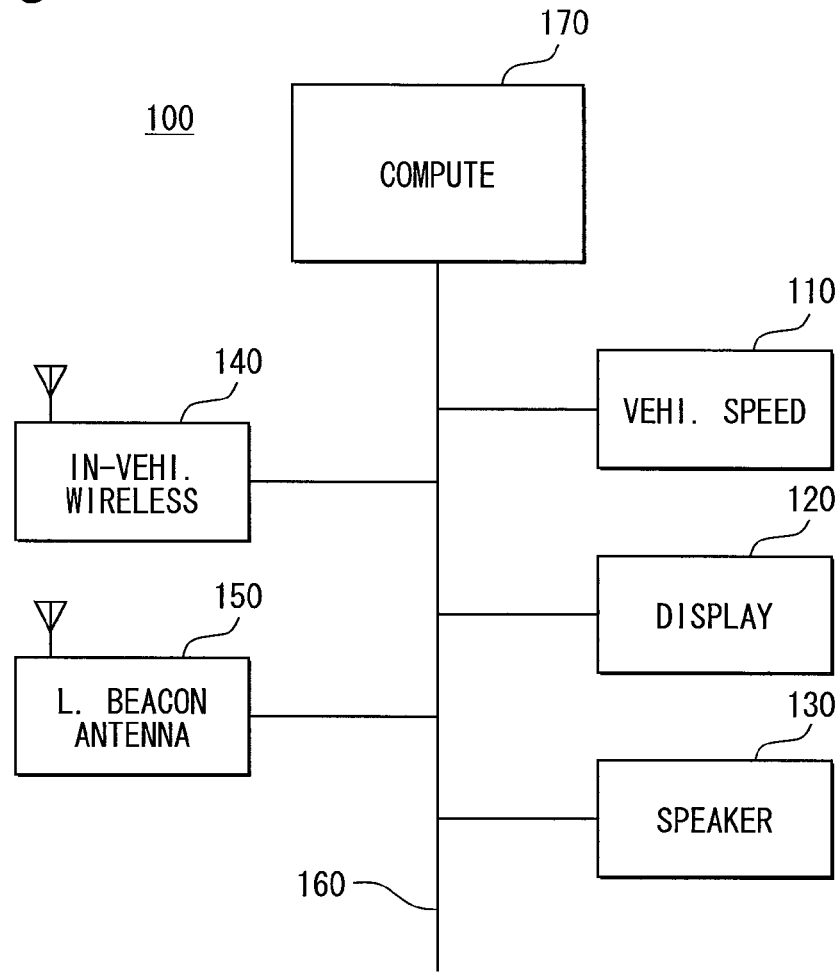
FIG. 3 is a diagram illustrating a configuration of an in-vehicle apparatus 100.

Next, a configuration of the in-vehicle apparatus 100 will be described with reference to FIG. 3. This in-vehicle apparatus 100 corresponds to an in-vehicle obstacle information notification apparatus. The in-vehicle apparatus 100 includes a vehicle speed sensor 110, a display device 120, a speaker 130, an in-vehicle wireless device 140, a light beacon antenna 150, and a computation device 170 connected to these components through the in-vehicle LAN 160.

Figure 4:
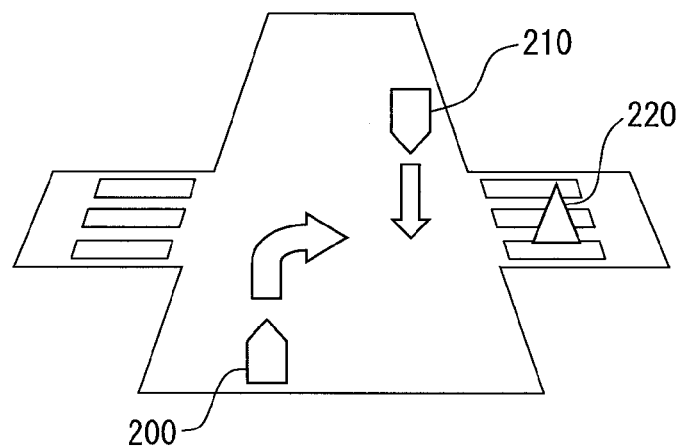
FIG. 4 is a diagram illustrating an intersection map.

The vehicle speed sensor 110 detects a vehicle speed pulse, which is proportional to vehicle speed. The vehicle speed sensor 110 provides the computation device 170 with the vehicle speed pulse or a vehicle speed signal determined from the vehicle speed pulse. The display device 120 corresponds to a display section or a display means. The display device 120 is placed at a predetermined position in the vehicle compartment so that the display device 120 is viewable from a driver seat. An intersection map is displayed on a predetermined region of a screen of the display device 120. The intersection map may be such one as shown in FIG. 4. The intersection map shown in FIG. 4 is a three dimensional map of an intersection and therearound, which is obliquely-downwardly viewed from a place above one side of the intersection. The one side of the intersection is a side on which the own vehicle travels before entering into the intersection. A shape of the intersection for the intersection map is pre-stored irrespective of an actual intersection shape. Alternatively, an intersection map reflecting an actual intersection shape (roads-intersecting angle or the like) may be used in stead of that show in FIG. 4. Alternatively, the intersection map may be a two-dimensional map. To display the intersection map reflecting the actual shape of the intersection, road map data may be acquired from another apparatus in the vehicle (such as navigation apparatus and the like). Alternatively, the intersection shape (road line shape information, which indicates the shape of the roads forming the intersection) may be acquired from the road side wireless apparatus 10 via the in-vehicle wireless device 140. Thereafter, the intersection map may be created based on the acquired intersection shape. Specifically, the road line shape information indicates an intersection shape by using nodes and links, and node attributes of some of the nodes. In this case, the in-vehicle wireless device 140 corresponds to an intersection shape acquisition section and an intersection shape means.

An own vehicle mark 200 representing the own vehicle is superimposed on the intersection map. Additionally, when it is determined that an on-coming vehicle is present, an on-coming vehicle mark 210 is displayed on an opposite side of the intersection from the own vehicle mark 200. When it is determined that an obstacle is present in or around the pedestrian crossing, an after-right-turn obstacle mark 220 is superimposed on the pedestrian crossing. The on-coming vehicle mark 210 and the after-right-turn obstacle mark 220 correspond to an obstacle mark. The speaker 130 outputs a predetermined sound in response to displaying the mark 210, 220 on the intersection map.

The in-vehicle wireless device 140 functions as a vehicle-to-road communication device and an inter-vehicle communication device. The in-vehicle wireless device 140 as the road-to-vehicle communication device receives the radio wave transmitted from the road side wireless apparatus 10, demodulates the received radio wave, and outputs it to the computation device 170. The in-vehicle wireless device 140 as the inter-vehicle communication device exchanges signals with in-vehicle wireless devices 140 mounted to other vehicles. The light beacon antenna 150 exchanges signals with the above-described light beacon 30 of the road.

The computation device 170 includes a computer with a CPU, a ROM, a RAM and the like. The CPU executes a program stored in the RAM while using a temporal storage function of the RAM. The computation device 170 thereby implements a map display process to display the intersection map on a display screen of the display device 120.

Figure 5:
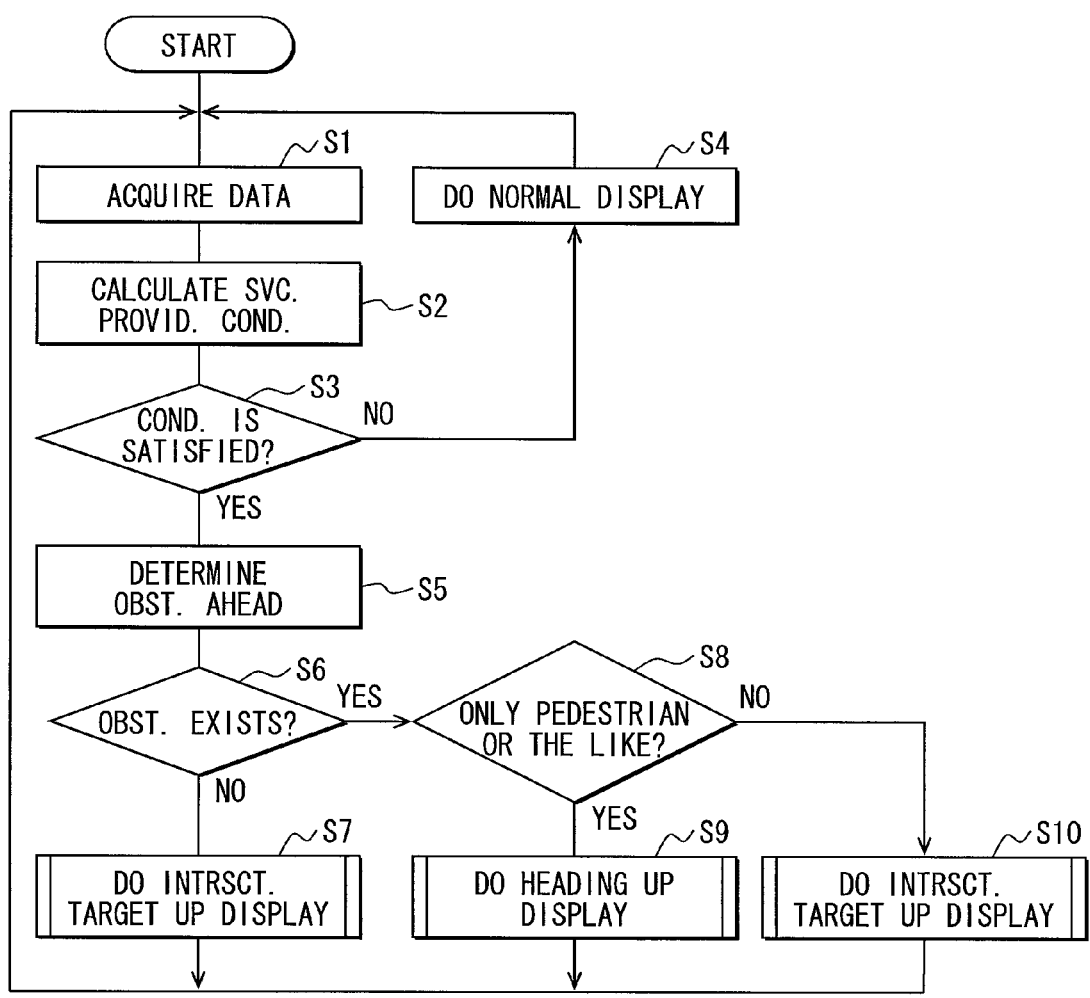
FIG. 5 is a flowchart illustrating a process performed by a computation device 170.

FIG. 5 is a flowchart specifically illustrating the map display process performed by the computation device 170. When being powered on, the computation device 170 performs the process illustrated in FIG. 5 at predetermined intervals. In step S1, a predetermined data is acquired. The predetermined data is used for calculating the assist service providing condition in next step S2

In subsequent step 2, based on the data acquired in step S1, the condition for providing an assist service is computed. The assist service of the present embodiment refers to a notification of the presence of an obstacle to a driver when the vehicle makes a turn at an intersection. The providing condition is that the vehicle is in an assist service area and a right blinker is ON. The assist service area corresponds to an intersection-surrounding area.

The assist service area ranges from a predetermined point before the intersection to a predetermined point after the right turn. A starting point of the area may be identified from a distance to the intersection or a coordinate point. Alternatively, the starting point of the area may be a point at which the vehicle passes through the light beacon 30 or a point at which the in-vehicle wireless device 140 becomes able to receive a signal from the road side wireless apparatus 10. In cases where the starting point is identified from the distance to the intersection, the starting point may be pre-stored in the map information and present position information may be acquired in order to determine the starting point. Although the end point of the area can be identified from a coordinate point or a distance from the intersection, it is assumed here that the end point is identified from the distance from the starting point of the area. In step S2, a travel distance from the starting point of the area is computed.

In subsequent step S3, it is determined whether or not the above-described assist service providing condition is satisfied. When this determination result is NO, the process proceeds to step S4. In step S4, the display of the display device 120 is switched into a normal display. When the intersection map is being displayed, this normal display refers to a display that was provided before the displaying of the intersection map. When the intersection map is not being displayed, the normal display refers to the presently-displayed display. If the display device 120 is a component of the navigation apparatus, the display that was provided before the displaying of the intersection map may be a two-dimensional map. The two-dimensional map may be displayed based on a map data of the navigation apparatus.

When it determined in step S3 that the assist service providing condition is satisfied (YES), the process proceeds to step S5. In step S5, it is determined whether or not an obstacle is present in a path ahead of an own vehicle. In the above, the path includes the right turn at the intersection. The term "ahead of" includes not only "ahead of the own vehicle at the present time" but also "ahead of the own vehicle in the future after the change in the heading direction of the own vehicle". Furthermore, the term "ahead of" includes not only "directly ahead of" but also "obliquely ahead of". Because of this, when an obstacle is present in or around a pedestrian crossing that the own vehicle is to pass after making the right turn, it is determined that the obstacle is present. After the own vehicle turns and heads in a direction of an intersection exit road, a vehicle traveling on an intersection entry road (which was the on-coming vehicle before the own vehicle made the right turn) is not positioned ahead of the own vehicle any more. Thus, after the own vehicle heads in the direction of the intersection exit road, the vehicle traveling on the intersection entry road no longer correspond to the obstacle. It should be noted that the obstacle is an object with a possible risk of collision with the own vehicle. This obstacle includes not only a moving object but also a motionless object that is temporarily stopping. However, the obstacle does not include a fixed object. In the determination in step S5, a detection result of the road side controller 50 is acquired via the road side wireless apparatus 10, and additionally, the position or direction of the own vehicle is acquired via the in-vehicle LAN 160. As for the on-coming vehicle, the presence of the on-coming vehicle may be directly detected by the inter-vehicle communications. Since the detection result of the road side controller 50 or the presence of the on-coming vehicle acquired by the inter-vehicle communications represents information on a movable body existing in an intersection-surrounding area, the in-vehicle wireless device 140, which acquires these kinds of information, corresponds to a movable body information acquisition section and a movable body information acquisition means.

In subsequent step S6, it is determined whether or not a result of the determination in step S5 indicates that the obstacle is present. When it is determined that the obstacle is absent (NO), the process proceeds to step S7. In step S7, an intersection target up display is performed. In the intersection target up display, the upper direction on the screen is fixed to a given direction, which the own vehicle has as the heading direction just before the entering the intersection. The intersection target up display is one kind of a first display mode, in which the upper direction of the map on the screen is fixed to a given direction that is determined before the entry into the intersection. Details of this intersection target up display will be described later with reference FIG. 8.

When it is determined that the obstacle is present in step S6 (YES), the process proceeds to step S8. In step S8, it is determined whether or not the obstacle is only a pedestrian or the like. The pedestrian or the like refers to an obstacle in or around a pedestrian crossing that the own vehicle is to pass after making a right turn. The pedestrian or the like includes not only a pedestrian but also, for example, a bicycle. This pedestrian or the like corresponds to an after-on-coming-lane-passage obstacle.

When it is determined that the obstacle is only the pedestrian or the like in step S8 (YES), the process proceeds to step S9. In step S9, the heading up display is performed. The heading up display is a display mode in which the present heading direction of the own vehicle points in the upper direction on the screen. Details of the heading up display will be described later with reference to FIG. 6. When it is determined in step S8 that the obstacle is not only the pedestrian or the like (NO), it is suggested that an on-coming vehicle is also present. In this case, the process proceeds to step S10 where the intersection target up display is performed. This step S10 is the same processing as step S7.

In the present embodiment, as can be clearly seen from the explanation on steps S6 to S10, when the obstacle includes the on-coming vehicle ahead in the route, the display mode becomes the intersection target up display. When the obstacle is the pedestrian or the like, the display mode becomes the heading up display. At the beginning of entry into a certain assist service area, if neither the on-coming vehicle nor the pedestrian is present (S6: NO), the display mode becomes the intersection target up display (S7). If only the pedestrian is present (S8: YES), the display mode becomes the heading up display (S9). If both of the on-coming vehicle and the pedestrian exist (S8: NO) are present, the display becomes the intersection target up display at the beginning (S10). In this regard, however, as explained in step S5, after the own vehicle heads in the direction of the intersection exit road, the on-coming vehicle is excluded from the obstacle ahead in the route. Therefore, even if the display mode was the intersection target up display at the beginning, the own vehicle may thereafter head in the direction of the intersection exit road, and thereafter, it may be determined that the obstacle is only the pedestrian (S8: YES), and thereafter, the display is switched into the heading up display. The computation device 170, which performs steps S5, S6, S8, corresponds to a determination means and a determination section. The computation device 170, which performs steps S7, S9, S10, corresponds to a map display control means and a map display control section.

The determination in step S8 as to whether or not the obstacle is only the pedestrian or the like will be more specifically described. The determination as to whether or not the obstacle is only the pedestrian or the like is made based on an obstacle detection result, which is transmitted from the road side wireless apparatus 10 and received by the in-vehicle wireless device 140. Since the road side wireless apparatus 10 transmits (broadcasts) the obstacle detection result without designating a transmission destination, the obstacle detection result include not only the presence of the pedestrian but also the presence of the vehicle. In view of this, after own vehicle heads in the direction of the intersection exits road, the information indicating the determination in step S8 neglects the presence of the vehicle, which is included in the obstacle detection result transmitted from the road side wireless apparatus 10.

A determination as to whether the own vehicle heads in the direction of the intersection exit road may be made based on a signal from a sensor which detects the direction of the own vehicle. However, the position of the own vehicle can approximately tell the direction of the own vehicle when the own vehicle turns at the intersection. Specifically, in a state where the own vehicle has got across a wait point of the intersection and has approached the on-coming lane, the own vehicle heads in the direction of the intersection exit road, or at least heads in a direction close to the direction of the intersection exit road. Therefore, it can be concluded that in a state where the own vehicle has got across the on-coming lane, the own vehicle heads in the direction of the intersection exit road. In view of this, when the position of the own has passed the intersection wait point or when the own vehicle has got across the on-coming lane, it can be determined that there is no on-coming vehicle and the obstacle may be only the pedestrian or the like (S8: YES). Thereafter, the display may be switched into the heading up display.

Figure 12:
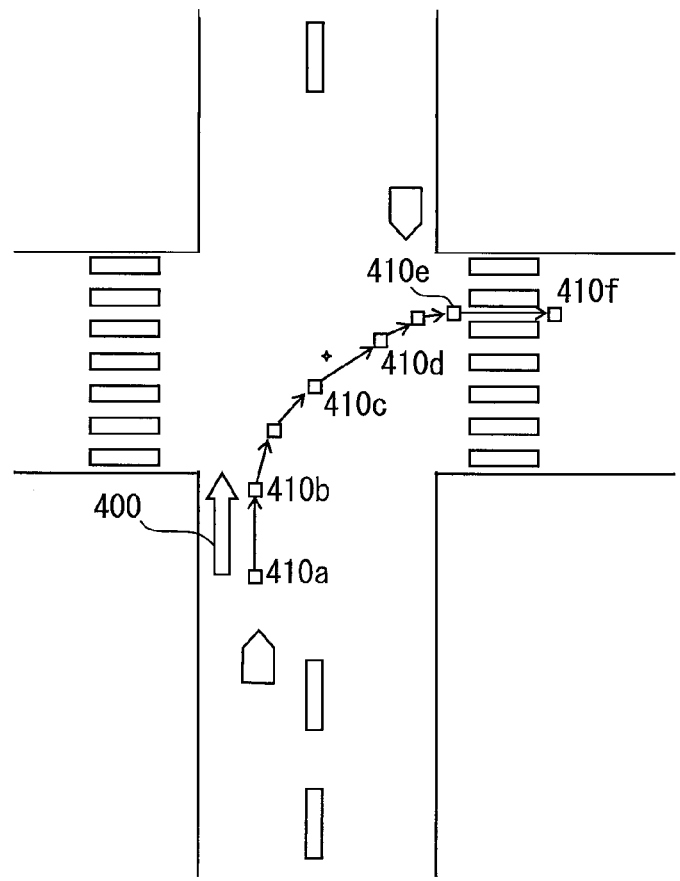
FIG. 12 is a diagram for explaining road line shape information.

A determination as to whether or not the position of the own vehicle passes the intersection wait point and a determination as to whether or not the position of the own vehicle gets across the on-coming lane are made based on the road line shape information transmitted from the road side wireless apparatus 10. This road line shape information includes nodes and node attributes, as described above. As shown in FIG. 12, a node 410*c* is provided with a node attribute "in-intersection right turn wait point" (corresponding to the wait point). A node 410*d* is provided with a node attribute "a point intersecting with an on-coming lane". A node 410*e* is provided with a node attribute "pedestrian crossing start point". A node 410*f* is provided with a node attribute "pedestrian crossing end point". When the own vehicle has passed the node 410*c* provided with the node attribute "in-intersection right turn wait point", it is determined that the position of the own vehicle has passed the intersection wait point. When the own vehicle has passed the node 410*d* provided with the node attribute "a point intersecting with an on-coming lane", it is determined that the own vehicle has got across the on-coming lane. A determination as to whether the own vehicle has passed the nodes 410 may be made in the following way. A distance from a light beacon passage point, which is a starting point, to the node 410 is calculated from a node-to-node distance, i.e., a link length. A traveling distance of the own vehicle after passage through the light beacon is calculated based on the number of tire rotations. By comparing these two distances, it is determined whether or not the own vehicle has passed the node 410.

Figure 6:
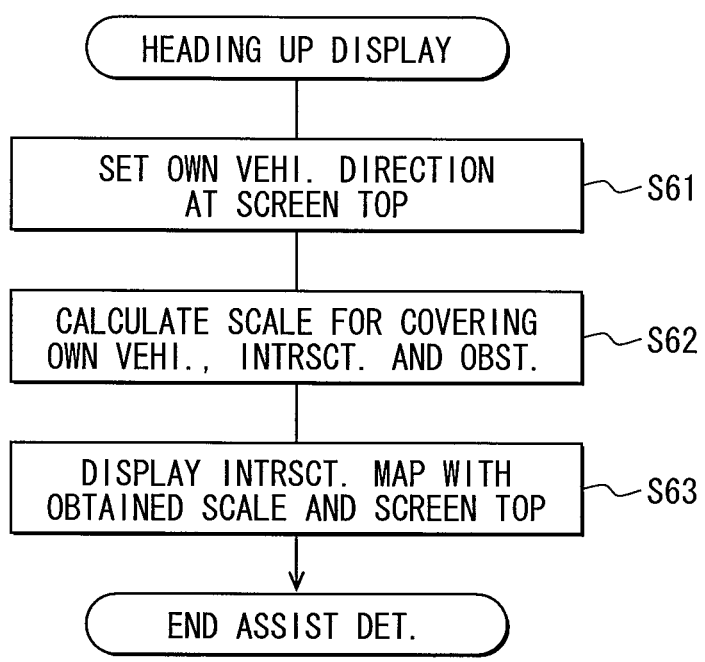
FIG. 6 is a flowchart illustrating details of a heading up display process in step S9 in FIG. 5.

Now, the heading up display process will be more specifically described with reference to FIG. 6. First, in step S61, a present traveling direction of the own vehicle is determined and the determined direction is set as the direction of the top of the screen. Specifically, the heading direction of the own vehicle at the present time is identified based on a signal from a geomagnetic sensor. Alternatively, the heading direction may be identified by individually using or appropriately combining a signal of gyro sensor and a signal of a steering angle. Alternatively, in a manner similar to that in determining whether the own vehicle has passed the node 410, a link of multiple links in which the own vehicle is located is identified. A direction of the link in which the own vehicle is located can be used as the heading direction of the own vehicle. In the above, the multiple links are acquirable as the road line shape information. Alternatively, the navigation apparatus may successively determine the heading direction by autonomous navigation or radio navigation. When the heading direction is acquirable from the navigation apparatus, the heading direction is acquired from the navigation apparatus.

In subsequent step S62, a largest map scale that allows displaying the own vehicle, an assist target intersection and the obstacle within the intersection map display region of the display device 120 is calculated. More specifically, a distance between the own vehicle and the obstacle (the pedestrian or the like in the case of the heading up display) is calculated. The map scale is calculated from a pre-stored relation used for calculating the map scale from the distance.

In step S63, the intersection map is displayed, so that the upper direction of the map on the screen is the direction obtained in step S61 and the map scale is the scale calculated in step S62. More specifically, in step S63, a rotation operation is performed to a basic intersection map (a pre-stored map or a map obtained from road map data), so that the direction obtained in step S61 points to the top of the screen. A left drawing part in each of FIGS. 7 A and 7B shows an actual situation of the position and direction of the own vehicle "A" with respect to the intersection. A right drawing part in each of FIGS. 7 A and 7B shows the intersection map after the rotation operation corresponding to the left drawing part is performed. In the left drawing part, the reference C denotes the pedestrian.

Figure 7A:
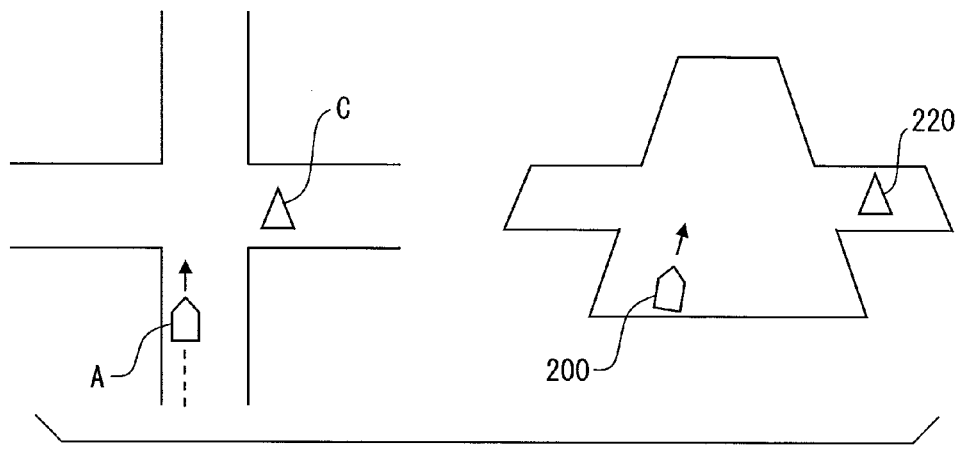
FIGS. 7A to 7C are diagrams each illustrating a position and a direction of own vehicle A with respect to an intersection (left drawing part) and an intersection map (right drawing part) after a rotation processing corresponding to the left drawing part is performed.
Figure 7B:
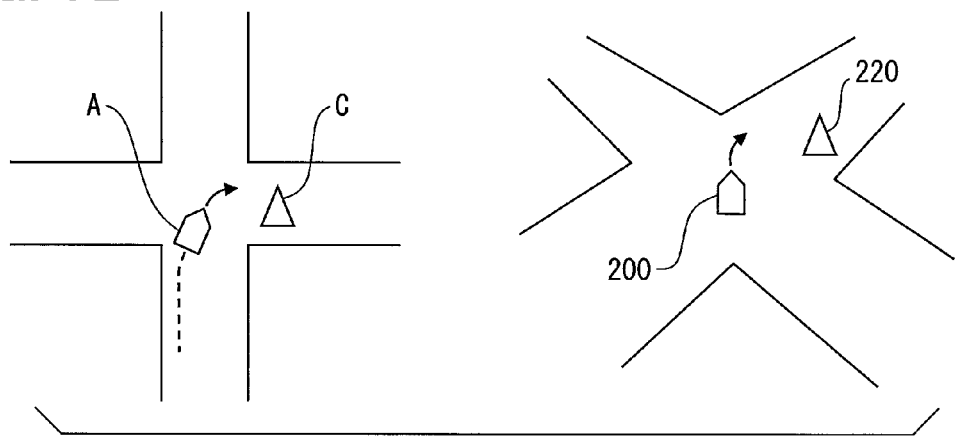

FIG. 7A shows a situation before the own vehicle "A" enters into the intersection, as seen from the left drawing part. As shown in the right drawing part of FIG. 7A, in the intersection map in this situation, the road on which the own vehicle "A" is traveling extends in a lower-to-upper direction. Additionally, the intersection exit road, which the own vehicle travels after making the right turn, extends in a left-to-right direction FIG. 7B shows a situation in which the own vehicle "A" has entered into the intersection by passing a stop line, and the heading direction is slightly changed rightward, as seen from the left drawing part. As seen form the right drawing part of FIG. 7B, in the intersection map in this situation, the road (intersection entry road) on which the own vehicle "A" vehicle had traveled extends from an obliquely upper left to an obliquely upper right. Additionally, a road on which the own vehicle "A" is to travel from now on extends from an obliquely upper right to an obliquely upper left, as seen from the left right drawing part.

Figure 7C:
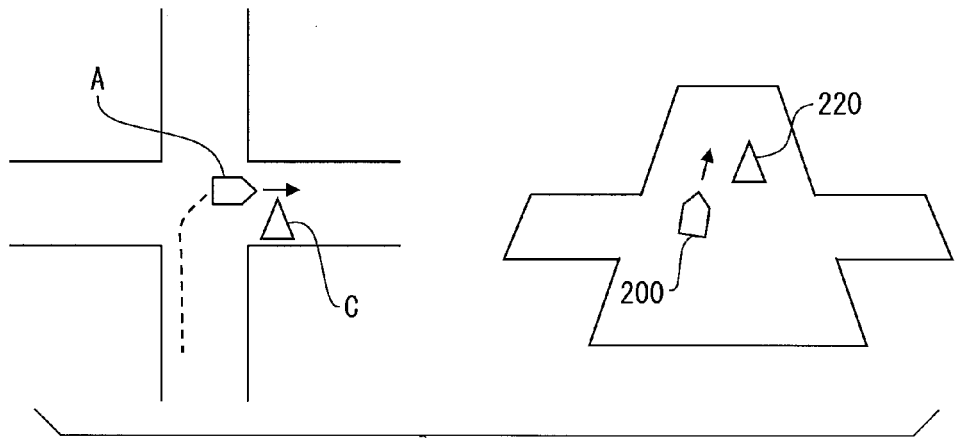

FIG. 7C shows a situation in which the own vehicle "A" almost completes the turn at the intersection and heads in a direction along the intersection exist road, as seen from the left drawing part. As seen from the right drawing part of FIG. 7C, in the intersection map in this situation, the intersection exit road extends in the lower-to-upper direction and the intersection entry road extends in the left-to-right direction.

In step S63, after the rotation operation as illustrated in FIGS. 7 A to 7C is performed, the size of the rotated intersection map is changed based on the map scale calculated in step S62. Additionally, the intersection map after the size change is displayed on the display device 120. The own vehicle mark 200 and the after-right-turn obstacle mark 220 are display with sizes according to the map scale of the intersection map.

The pedestrian or the like may be present in the intersection exit road, which the own vehicle travels after making the right turn. A direction of the intersection exit road with respect to the own vehicle changes to a large extent while the own vehicle is traveling. Since the heading up display keeps the top of the screen at the present heading direction of the own vehicle, the heading up display enables the driver to figure out, without confusing, that the pedestrian or the like is present in the heading direction of the own vehicle, even if the direction of the pedestrian or the like with respect to the own vehicle changes to a large extent.

Figure 8:
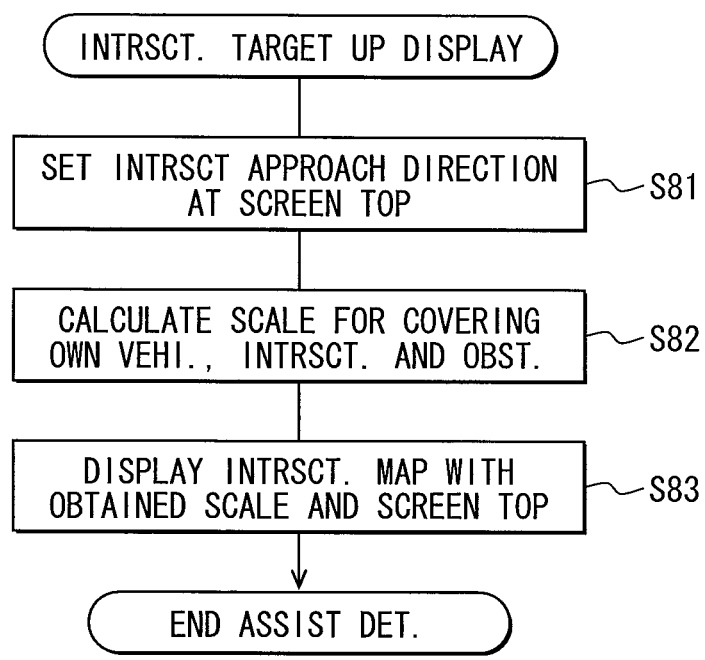
FIG. 8 is a flowchart illustrating an intersection target up display process in step S7, S10 in FIG. 5.

Now, the intersection target up display process will be more specifically described with reference to FIG. 8. First, in step S81, it is determined that the upper direction on the screen should be kept at the approaching direction to the assist target intersection. This approaching direction to the assist target intersection is a direction of the last link just before the intersection. The approaching direction is illustrated by an arrow 400 in FIG. 12.

In subsequent step S82, a largest map scale that allows displaying the own vehicle, the assist intersection and the obstacle within the intersection map display region of the display device 120 is calculated. More specifically, a distance between the own vehicle and the obstacle (in the intersection target up display, at least the on-coming vehicle is present) is calculated. From a pre-stored relation for calculating the map scale from the distance, the map scale is calculated. In step S83, the intersection map is displayed by using the upper direction on the screen obtained in step S81 and the map scale calculated in step S82. The own vehicle mark 200, the on-coming vehicle mark 210, and the after-right-turn obstacle mark 220 are also displayed with sizes according to the scale of the intersection map.

Since the intersection target up display is a display mode in which the heading direction of the own vehicle just before the entry into the intersection keeps pointing to the top of the screen, the road before the entry into the intersection extends in the lower-to-upper direction of the screen regardless of the present direction of the own vehicle, as illustrated in FIG. 4. Next, advantages of the intersection target up display will be described.

Figure 9A:
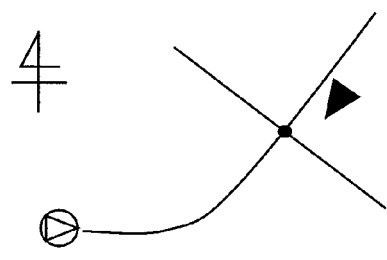
FIGS. 9A to 9D are diagrams illustrating an intersection target up display mode in comparison with an actual road shape and other display modes.
Figure 9B:
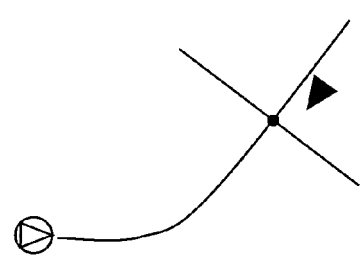
Figure 9C:
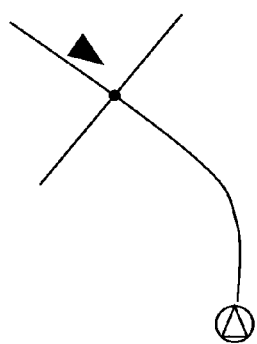
Figure 9D:
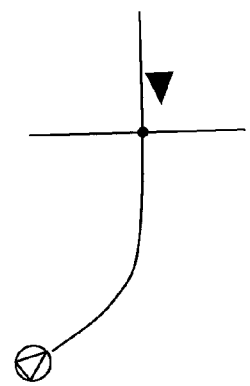

FIGS. 9A to 9D are diagrams illustrating the intersection target up display in comparison with an actual road shape and other display modes. FIG. 9A is a schematic view of an actual road shape of an intersection and therearound, which is covered by the intersection map. FIGS. 9B, 9C and 9D illustrate the north up display, the heading up display and the intersection target up display, respectively.

In FIG. 9A, the road on which the own vehicle (the own vehicle mark is an open triangle surrounded by an open circuit) is traveling is curved between the own vehicle and the intersection. A road portion at which the own vehicle is presently actually traveling extends in an eastward direction. A road portion in vicinity of the intersection extends in a northeastward direction. The road intersects with another road at an approximately right angle As shown FIG. 9B, in the north up display, the top of the screen is north. Thus, when the own vehicle is around the intersection, the intersection entry road and the intersection exit road are displayed as obliquely-extending roads. As shown in FIG. 9C, in the heading up display, the top of the screen is the heading direction at the present time. Thus, when the actual situation is like that in FIG. 9A, the intersection is displayed in the upper left of the own vehicle. In the north up display and the heading up display, the displayed position or orientation of the assist target intersection changes depending on the extending direction of the vehicle-traveling road or the heading direction of the vehicle. By contrast, in the intersection target up display, the top of the screen is fixedly maintained at the approaching direction to the intersection, as shown in FIG. 9D. Therefore, even when the actual shape of the road from the present position of the vehicle to the intersection is curved and the own-vehicle-traveling road does not extend north-south as shown in FIG. 9A, the top of the screen is kept at the approaching direction to the intersection. Because of this, it becomes easier to figure out that an oncoming vehicle is approaching the intersection in a direction opposite to the heading direction of the own vehicle.

Figure 10A:
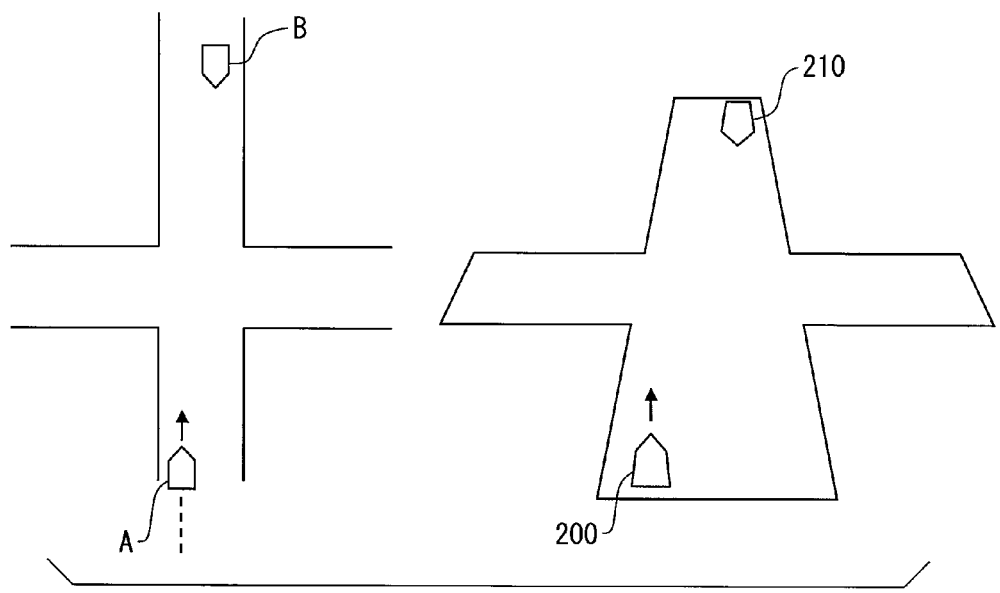
FIGS. 10A and 10B are diagrams illustrating an intersection map scale change in an intersection target up display mode.
Figure 10B:
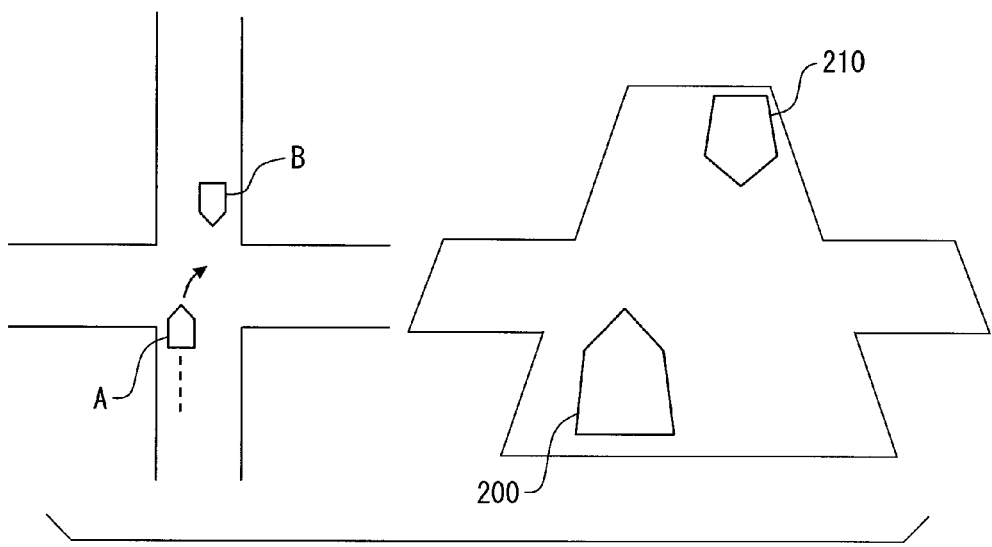

FIGS. 10A and 10B are diagrams illustrating a scale change of the intersection map in the intersection target up display. In FIGS. 10A and 10B, a left drawing part shows an actual positional relation between an own vehicle "A" and an on-coming vehicle "B". A right drawing part shows an example of the displayed intersection map corresponding to the right drawing part. Specifically, FIG. 10A illustrate the display in cases where a distance between the host vehicle "A" and the on-coming vehicle "B" is relatively long. FIG. 1B illustrates the display in cases where the distance between the host vehicle "A" and the on-coming vehicle "B" is relatively short.

As shown in FIGS. 10A and 10B, the smaller the distance between the host vehicle "A" and the on-coming vehicle "B" is, the larger sizes the own vehicle mark 200 and the on-coming vehicle mark 210 are displayed. Thus, the intersection map enables the recognition of the distance between the host vehicle "A" and the on-coming vehicle "B".

According to the present embodiment, when the on-coming vehicle is present in the heading direction of the own vehicle, the intersection map is displayed in the intersection target up display mode, in which the top of the screen is the intersection approaching direction of the own vehicle. Therefore, the presence of the on-coming vehicle can be easily recognized. Furthermore, the display mode of the intersection map is successively determined. The on-coming vehicle may be present in the heading direction of the own vehicle at the beginning (before the right turn), and thereafter, the own vehicle may make the right turn at the intersection and get across the on-coming lane, and as a result, the on-coming vehicle may no longer be present in the heading direction of the own vehicle. Then, if it is determined that the pedestrian or the like is present, the intersection map is displayed in the heading up display mode. Therefore, the presence of the pedestrian or the like can be also easily recognized.

In the above-described embodiment, based on whether or not the obstacle (on-coming vehicle, pedestrian or the like) is present ahead of the own vehicle in the route, the display mode is switched between the intersection target up display and the heading up display. Alternatively, the display mode may be switched not based on the presence and absence of the obstacle but based on the position of the own vehicle with respect to the intersection. For example, a point in the intersection at which the own vehicle heads in the intersection exit road after turning at the intersection may be set to a display switch point. Before the own vehicle reaches the display switch point, the display mode may be set to the intersection target up display. After the own vehicle reaches the display switch point, the display may be set to the heading up display. This display switch point is a point at which the on-coming vehicle is no longer present ahead of the own vehicle. Therefore, the display mode is kept at the intersection target up display while the attention should be paid to the on-coming vehicle. This enables easier recognition of the on-coming vehicle. Additionally, when the own vehicle heads in the direction of the intersection exit direction after making the right turn at the intersection, the display is switched into the heading up display. This enables easier recognition of the pedestrian or the like in the route. It should be noted that in this configuration, the position of the own vehicle may be successively computed by the computation device 170. That is, in this configuration, the computation device 170 acts as an own vehicle position calculation section and a own vehicle position calculation means.

In the below embodiments, the display mode is switched based on the position of the own vehicle with respect to the intersection. In the following description, like references are used to refer to like elements, except as otherwise specifically provided.

Second Embodiment

Figure 13:
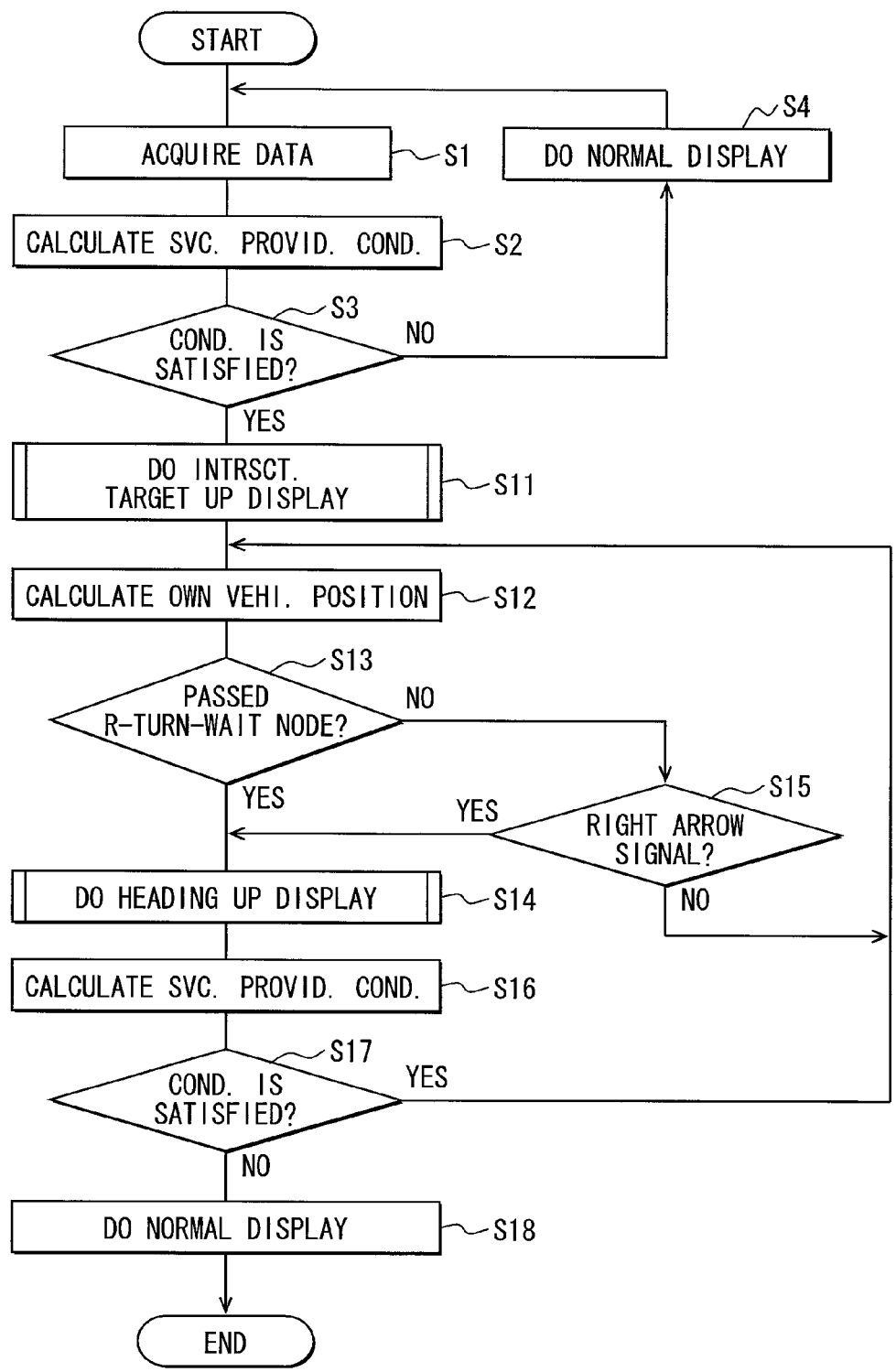
FIG. 13 is a flowchart illustrating a process performed by a computation device 170 in a second embodiment.

A second embodiment will be described below. The second embodiment is substantially the same as the first embodiment in mechanical configuration. FIG. 13 is a flowchart illustrating a process performed by the computation device 170 in the second embodiment.

Steps S1 to S4 in FIG. 13 are the same processing as those in FIG. 5. When it is determined in step S3 that the assist service providing condition is satisfied, the process proceeds to step S11. In step 11, the same processing as that in step S7 in FIG. 5 is performed, so that the intersection map is displayed in the intersection target up display.

In step S12, the position of the own vehicle with respect to the intersection is calculated. The calculation of the position of the own vehicle may be a process of calculating a travel distance from the starting point based on the number of tire rotation. The starting point is the point where the own vehicle passes the light beacon 30.

In step S13, it is determined whether or not the position of the own vehicle, which is calculated in step S12, has passed the in-intersection right turn wait node 410c. In the second embodiment, this in-intersection right turn wait node 410c corresponds to a display switch node. The position of the in-intersection right turn wait node 410c is included in the road line shape information acquired from the road side wireless apparatus 10. The in-vehicle wireless device 140, which acquires the information from the road side wireless apparatus 10, corresponds to a road line shape information acquisition section and a road line shape information acquisition means. Additionally, since the information from the road side wireless apparatus 10 includes information on the on-coming vehicle, the in-vehicle wireless device 140 corresponds to an on-coming vehicle information acquisition section and an on-coming vehicle information acquisition means.

More specifically, a distance from the starting point (light beacon passage point) to the in-intersection right turn wait node 410c is calculated based on the road line shape information. When the distance calculated in step S12 exceeds the distance from starting point to the in-intersection right turn wait node 410c, it is determined that the own vehicle has passed the in-intersection right turn wait node 410c.

When the determination in step S13 results in YES, the process proceeds to step S14. In step S14, the same processing as that in step S9 in FIG. 5 is performed, so that the display of the intersection map is switched in the heading up display. When the determination in S13 results in NO, the process proceeds to step S15.

In step S15, it is determined whether or not the traffic signal at the intersection lights up a right turn arrow. When this determination results in YES, the process proceeds to step S14. When this determination results in NO, the process returns to step S12.

In step S16, the data for calculating the assist service providing condition is acquired. Additionally, the assist service providing condition is calculated based on the acquired data. In step S17, it is determined whether or not the assist service providing condition is satisfied. When this determination results in YES, the process returns to step S12. When this determination results in NO, the process proceeds to step S18. In step S18, the display screen of the display device 120 is switched into the normal display. The meaning of this normal display is the same as that in step S4.

Figure 14A:
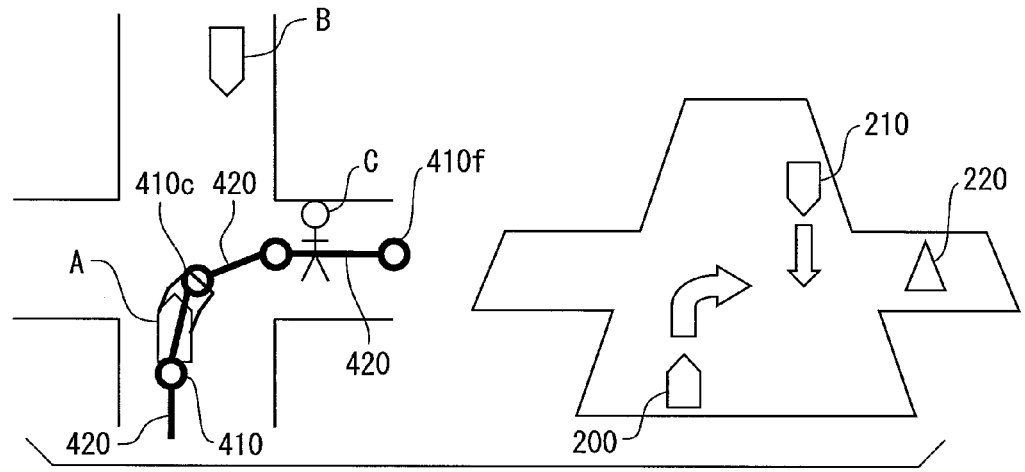
FIGS. 14A to 14C are diagrams illustrating an intersection map change in the second embodiment.
Figure 14B:
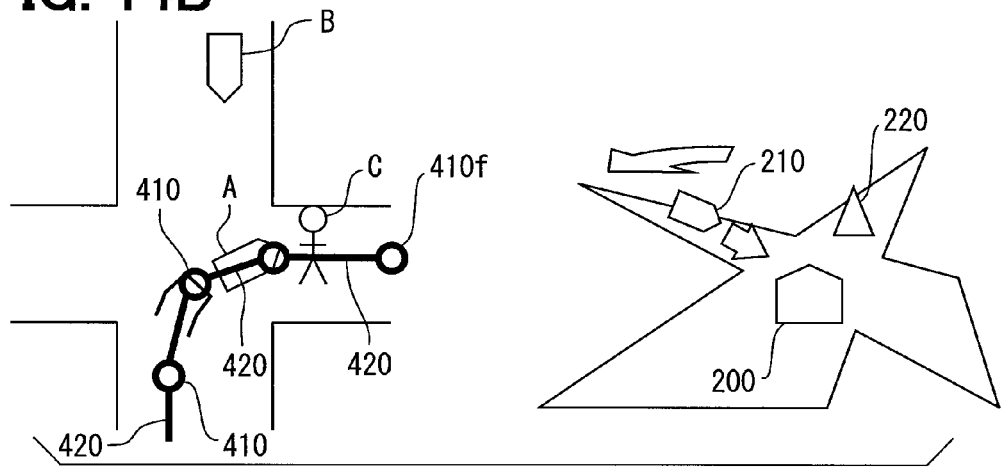
Figure 14C:
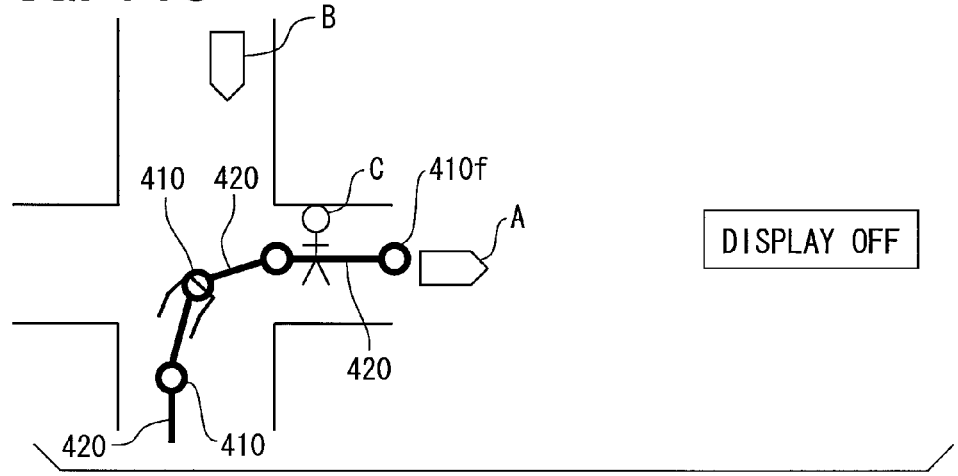
Figure 15A:
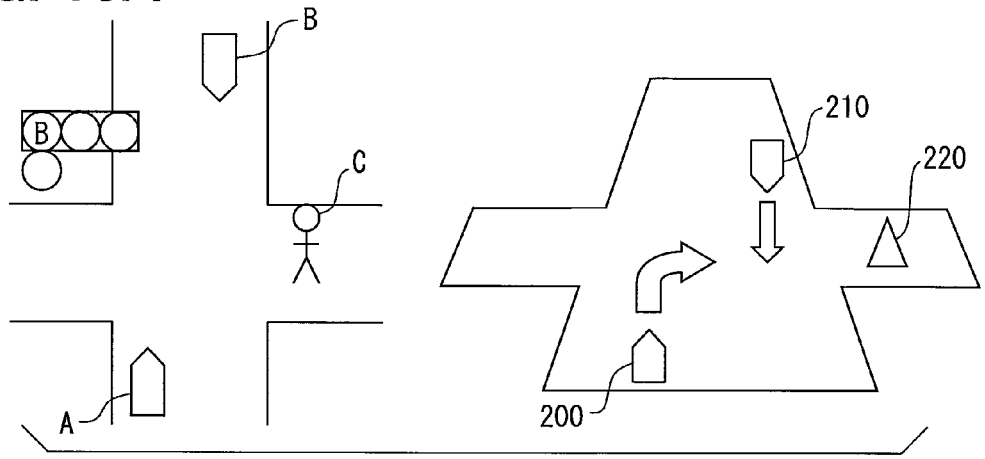
FIG. 15A to 15C are diagrams illustrating another intersection map change in the second embodiment.
Figure 15B:
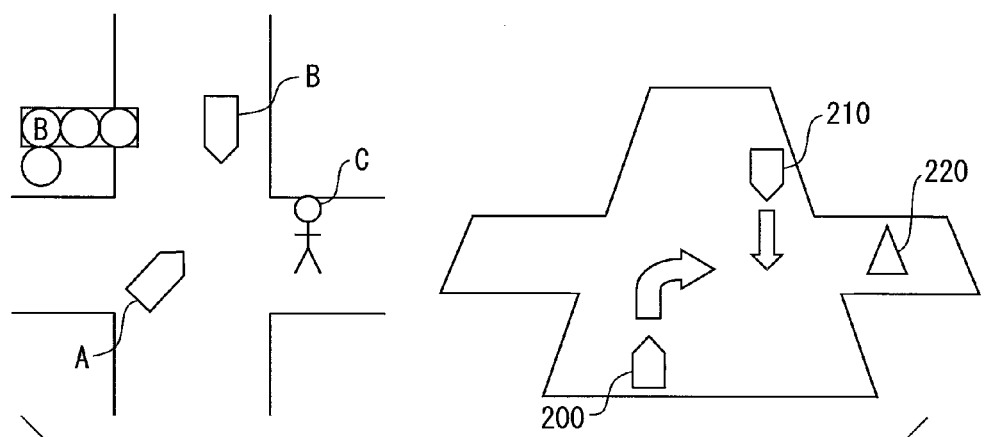
Figure 15C:
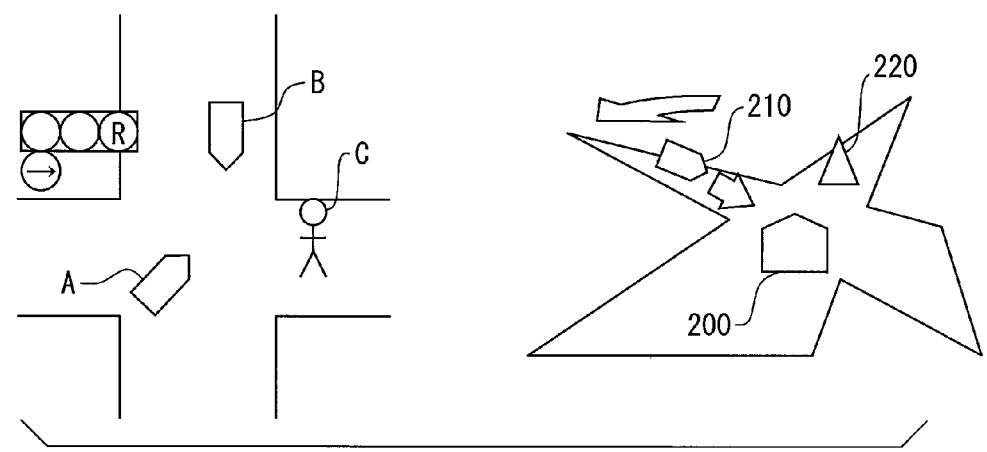

FIGS. 14A to 14C and FIGS. 15A to 15C illustrate intersection map changes in the second embodiment. FIGS. 14A to 14C illustrate that the display mode is changed in response to YES in step S13. FIGS. 15A to 15C illustrate that the display mode is changed in response to YES in step S15. In each of FIGS. 14A to 14C and FIG. 15A to 15C, the left drawing part shows an actual situation of the position and direction of the own vehicle "A" with respect to the intersection, and the right drawing part shows the intersection map corresponding to the right drawing part.

FIGS. 14A to 14C will be explained. In FIGS. 14A to 14C, the nodes 410 and the links 420 included in the road line shape information are depicted. FIG. 14A shows a situation in which the own vehicle "A" begins to enter the intersection after passing the stop line and has not passed the in-intersection right turn wait node 410c yet, as shown in the left drawing part. In this situation, the step 13 in FIG. 13 is NO. If, in this situation, the traffic signal color is green and permits passage, the step 15 is also NO. Accordingly, the display of the intersection map is the intersection target up display.

FIG. 14B illustrates that the own vehicle A has passed the in-intersection right turn wait node 410c, as shown in the left drawing part. In this situation, the step 13 in FIG. 13 is YES. Accordingly, the display mode of the intersection map is the heading up display. When the display is switched from that in FIG. 14A to that in FIG. 14B, the map is rotated in a direction as indicted by the arrow in FIG. 14B. When the display mode is switched from the intersection target up display to the heading up display, the map may be directly switched to a map with a final angle determined by the direction of the own vehicle, or alternatively, the map may be gradually rotated to the angle. When the map is gradually rotated, rotation speed may increase with increasing vehicle speed to shorten a time taken to reach the final state.

FIG. 14C illustrates that the own vehicle "A" has passed a pedestrian crossing end node 410f, as shown in the left drawing part. When a termination of the assist service area is designated the pedestrian crossing end node 410f, the step S17 is NO. Accordingly, the display returns to the normal display, which may be the display that was provided before the displaying of the intersection map. In the example in FIG. 14, the display is off.

Next, FIGS. 15A to 15C will be explained. The left drawing part of FIG. 15A shows a situation where the own vehicle "A" is located before the intersection (more specifically, located just before the stop line), and accordingly, the step 13 in FIG. 13 results in NO. Each of FIGS. 15A to 15C depicts a state of the traffic signal with a letter or an arrow, which indicates that its traffic signal is in lighting up state. In FIG. 15A, the traffic signal color is green and permits passage (represented by B in FIG.). Thus, step 15 also results in NO, and accordingly, the display mode is switched in the intersection target up display.

FIG. 15A shows a situation in which the own vehicle "A" is waiting to make the right turn while heading toward the intersection exit road to a large degree, as shown in the left drawing part. In the situation of FIG. 15, the own vehicle "A" has not passed the in-intersection right turn wait node 410c yet, although the nodes 410 are not shown in this FIG. Therefore, step 13 in FIG. 13 is kept NO, and additionally, the traffic signal light is kept green. Accordingly, the display is kept at the intersection target up display.

FIG. 15C illustrates that although the position of the own vehicle "A" is the same as FIG. 15B, the traffic signal color has been changed from green into the right allow, and accordingly, step 15 result in YES. Because of this, although the position of the own vehicle A is unchanged from that in FIG. 15B, the display mode of the intersection map is switched into the heading up display. As shown in the right drawing part of FIG. 15C, the intersection map is displayed such that the intersection exit road and the after-right-turn obstacle mark 220 are located in the vicinity of the top of the screen.

According to the second embodiment described above, until the position of the own vehicle "A" passes the in-intersection right turn wait node 410c, the intersection map is displayed in the intersection target up display, in which the upper direction of the intersection map is the own vehicle's approaching direction to the intersection. Therefore, the on-coming vehicle mark 210 superimposed on the intersection map can be easily recognized. Furthermore, when the own vehicle has passed the in-intersection right-turn wait node 410c and when the pedestrian crossing of the intersecting road is present in the heading direction, the intersection map is displayed in the heading up display, which facilitates the recognition of the intersecting road. Therefore, the after-right turn obstacle mark 220 superimposed on the intersection map can be easily recognized.

When the traffic signal is a right arrow, a vehicle is unlikely enter into the intersection from the on-coming lane. Thus, in the second embodiment, even before the own vehicle "A" passes the in-intersection right turn wait node 410c, the display mode of the intersection map is switched into the heading up display in response to change of the traffic signal into the right arrow. In this way, it becomes easier to recognize the after-right-turn obstacle mark 220, which represents the obstacle that is located on a far side of the on-coming lane and that requires the utmost attention during ON of the right arrow.

Third Embodiment

Figure 16:
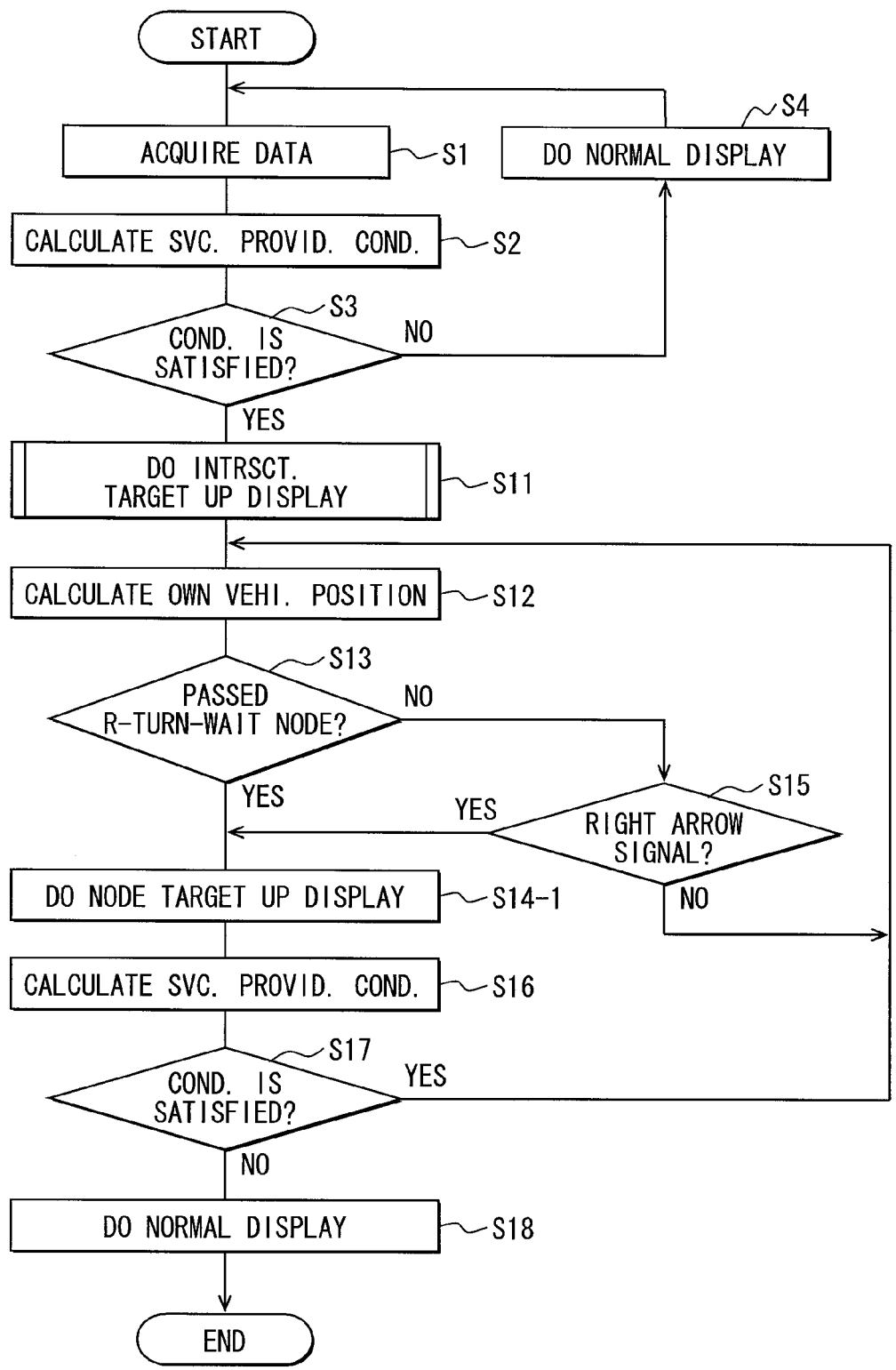
FIG. 16 is a flowchart illustrating a process performed by a computation device 170 in a third embodiment.

Next, a third embodiment will be described. The third embodiment is substantially the same as the first embodiment in mechanical configuration. FIG. 16 is a flowchart illustrating a process performed by the computation device 170 in the third embodiment.

The flowchart of FIG. 16 only differs from that of FIG. 13 of the second embodiment in that step 14-1 is performed in stead of step S14. Specifically, in step S14 of FIG. 13, the display mode of the intersection map is switched into the heading up display mode. In step S14-1 of the third embodiment, the display mode of the intersection map is switched into a node target up display.

This node target up display is a display mode in which the upper direction on the screen is a direction from a near side one of two predetermined nodes 410 to the far side other of the two predetermined nodes 410. The near side one is the in-intersection right-turn wait node 410*c* (display switch node) or a node after the in-intersection right-turn wait node 410*c*.

Figure 17A:
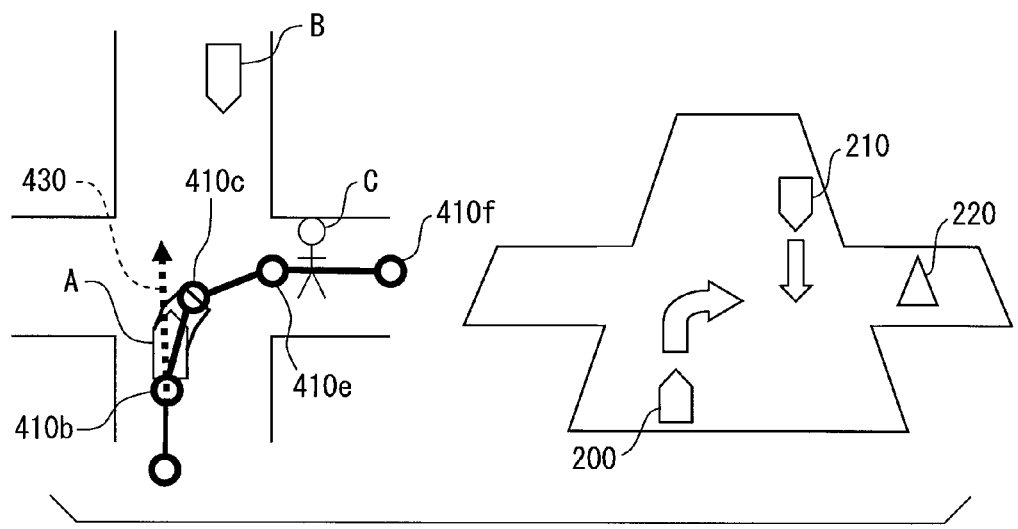
FIGS. 17A and 17B are diagram for explaining a node target up display mode.

The node target up display will be specifically described with reference to FIGS. 17A and 17B. FIG. 17A differs from FIG. 14A in that the upper direction of the intersection map is indicated by a dashed line arrow 430A. The positions of the own vehicle "A", the on-coming vehicle "B" and the pedestrian "C" in FIG. 17A are the same as those in FIG. 14(A). When the situation is like that in the left drawing part of FIG. 17A, the third embodiment also performs the intersection target up display. Therefore, the right drawing part of FIG. 17A is the same as that of FIG. 14A.

Figure 17B:
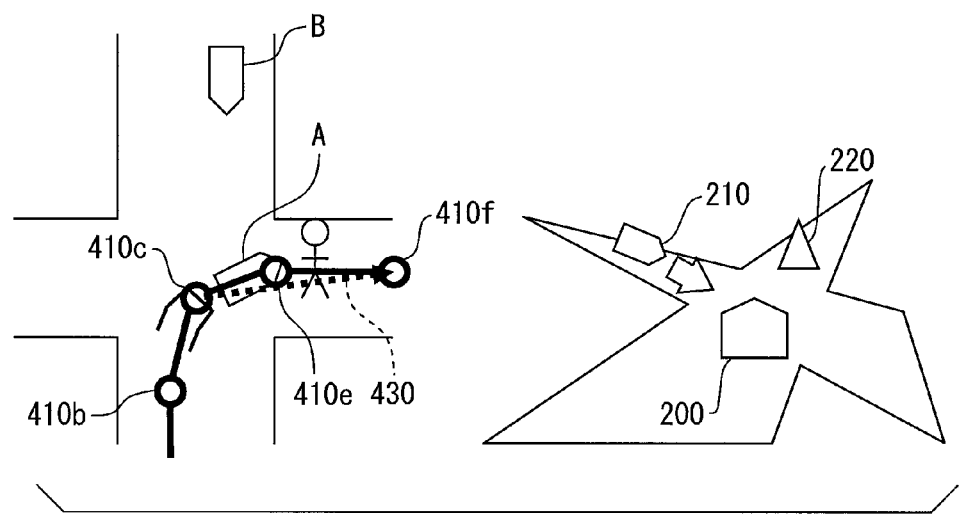

The left drawing part of FIG. 17B shows a situation where the own vehicle "A" has traveled and passed the in-intersection right turn wait node 410*c*. A dashed arrow 430B shown in the left drawing part of FIG. 17B indicates the upper direction of the intersection map.

In FIG. 17B, the dashed arrow 430B points in a direction from the in-intersection right turn wait node 410*c* toward the pedestrian crossing end node 410*f*. In the right drawing part of FIG. 17B, the far side node of the dashed arrow 430B in the heading direction, i.e., the pedestrian crossing end node 410*f*, is at the upper of the intersection map on the screen.

The direction of the dashed arrow 430B and the direction of the own vehicle "A" are similar, as can be seen from the left drawing part of FIG. 17B. Therefore, by determining the upper direction of the intersection map on the screen based on the direction of the nodes 410, it is possible to change the upper direction of the intersection map on the screen in response to a direction change of the own vehicle "A" without the use of the signal of the sensor that detects the vehicle direction. Therefore, even if the own vehicle is not equipped with the sensor that detects the vehicle direction, it is possible to change the upper direction of the intersection map on the screen in response to the direction change of the own vehicle.

(First Modification Example of Third Embodiment)

In the above-described third embodiment, the upper direction of the intersection map is the direction between the two nodes 410*c* and 410*f*, between which the on-coming road intersecting node 410*d* and the pedestrian crossing start node 410*e* are located. Alternatively, the upper direction of the intersection map on the screen may be a direction of the link in which the own vehicle is located after passing the in-intersection right turn wait node 410*c* (i.e., a direction between nodes between which the own vehicle "A" is located).

(Second Modification Example of Third Embodiment)

At a time when the own vehicle passes the in-intersection right turn wait node 410*c*, the intersection map may be displayed so that the upper direction of the intersection map on the screen is a direction from a pedestrian crossing start node 410*e* to a pedestrian crossing end node 410*f*. Just after the own vehicle passes the in-intersection right turn wait node 410*c*, the own vehicle does not head in the direction of the intersection exit road yet. However, according to the above configuration, at the when the own vehicle passes the in-intersection right turn wait node 410*c*, the intersection map may be displayed so that the pedestrian crossing of the intersection exit road is displayed at the upper part of the screen. Therefore, the obstacle at the pedestrian crossing can be easily recognized. In particular, this configuration may be favorable when the own vehicle passes the in-intersection right turn wait node 410*c* at a high speed (greater than or equal to a predetermined speed) and reaches the pedestrian crossing in a short time.

Fourth Embodiment

Figure 18:
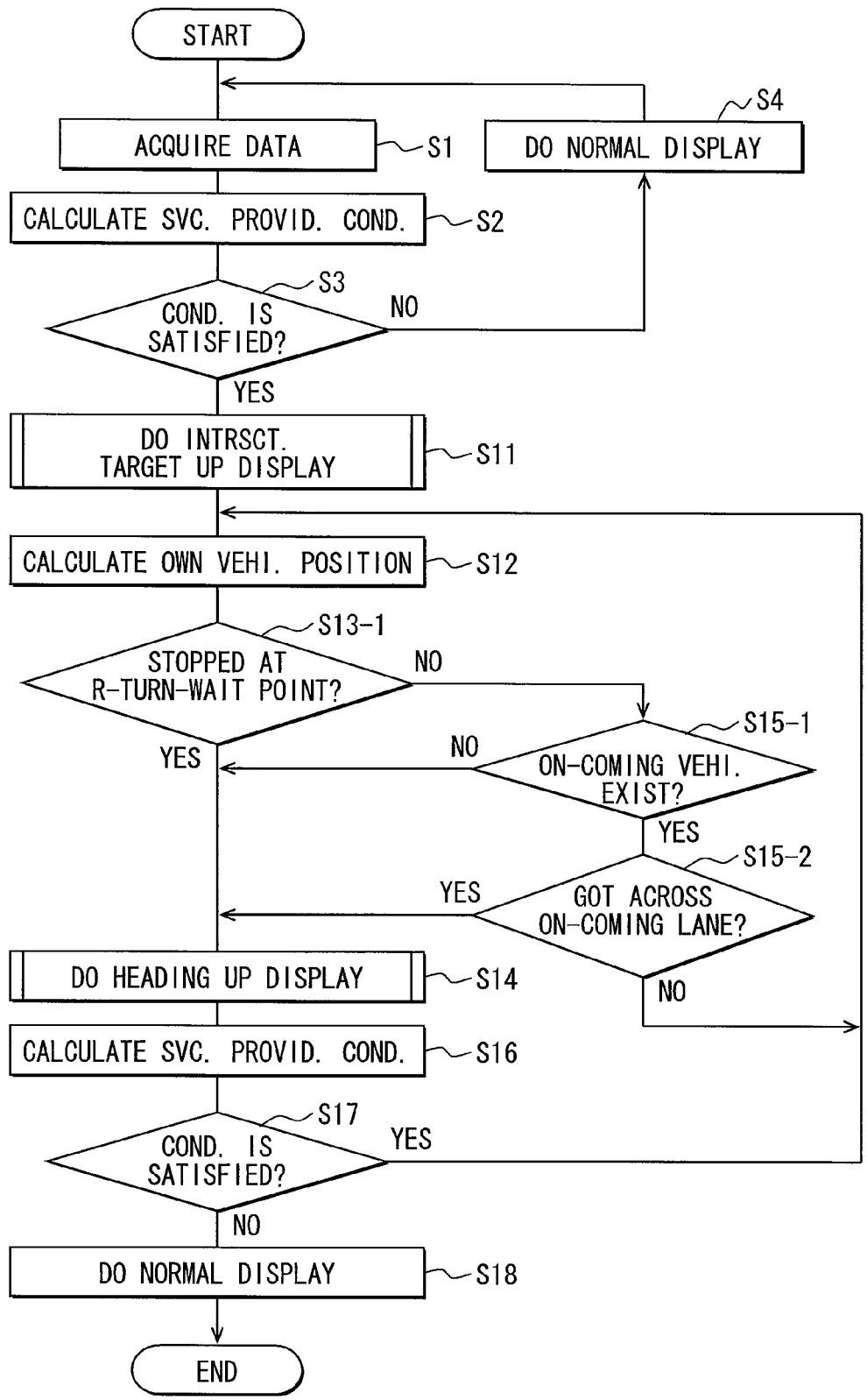
FIG. 18 is a flowchart illustrating a process performed by a computation device 170 in a fourth embodiment.

A fourth embodiment will be described below. The fourth embodiment is also substantially the same as the first embodiment in mechanical configuration. FIG. 18 is a flowchart illustrating a process performed by the computation device 170 in the fourth embodiment.

The flowchart of FIG. 18 differs from that of FIG. 16 of the third embodiment in that step S13-1 is performed in place of S13 and steps S15-1, S15-2 are performed in place of step S15.

In step S13-1, it is determined whether or not the own vehicle A is stopped at a point before the right turn wait point in the intersection. When this determination result is YES, the process proceeds to step S14. In step S14, the display mode is switched to the heading up display mode.

When step 13-1 is YES, the process proceeds to step S15-1. In step S15-1, it is determined whether not the on-coming vehicle is present. In this determination, regardless of the direction of the own vehicle, it is determined whether or not the on-coming vehicle is present. When this determination result is NO, in other words, when the on-coming vehicle is not present, the process proceeds to step S14. In step S14, the display mode is switched into the heading up display. When this determination result is YES, in other words, when the on-coming vehicle is present, the process proceeds to step S15-2. In step S15-2, it is determined whether or not the own vehicle "A" has got across the on-coming lane. This determination is based on whether or not the own vehicle "A" has passed the on-coming road intersecting node 410*d*, which intersects with the on-coming lane. Alternatively, the pedestrian crossing start node 410*e* may be used in place of the on-coming road intersecting node 410*d*. When step S15-2 is YES, the process proceeds to step S14 in order to switch the display mode into the heading up display. When this determination is NO, the process returns to step S12.

Figure 19A:
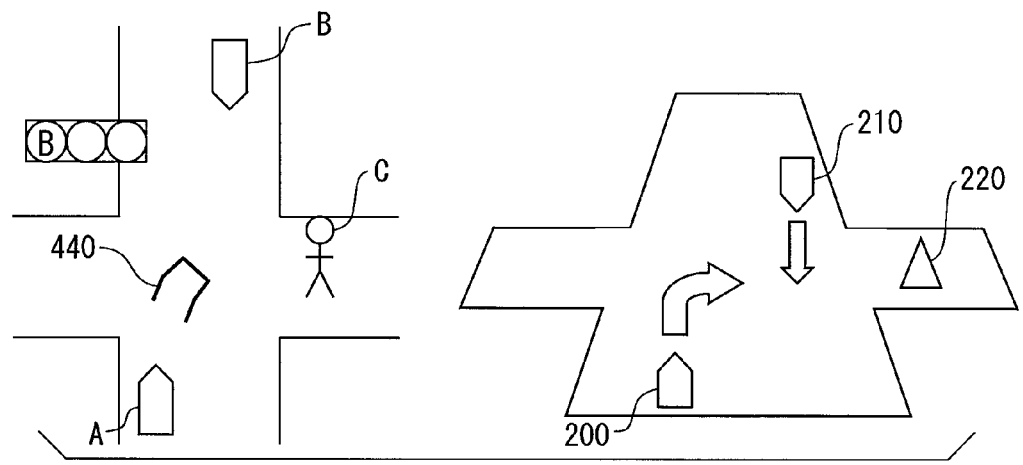
FIGS. 19A to 19C are diagrams illustrating an intersection map change in the fourth embodiment.
Figure 19B:
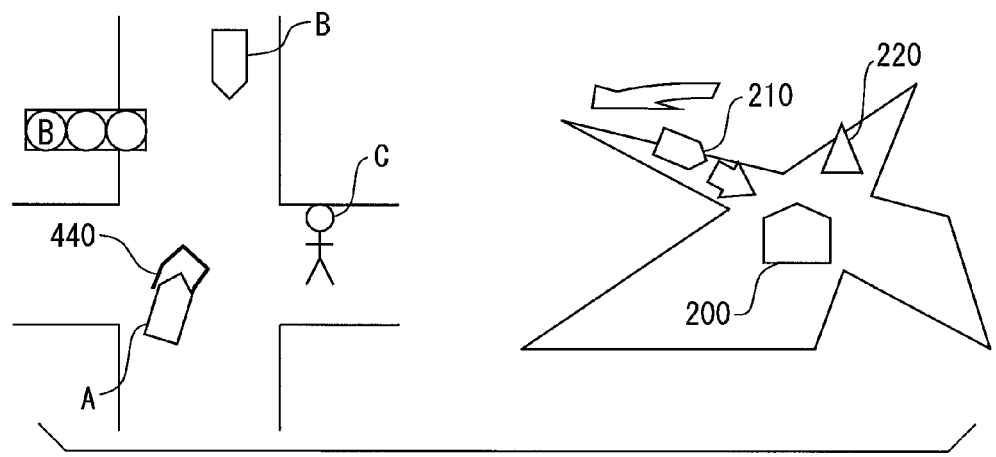
Figure 19C:
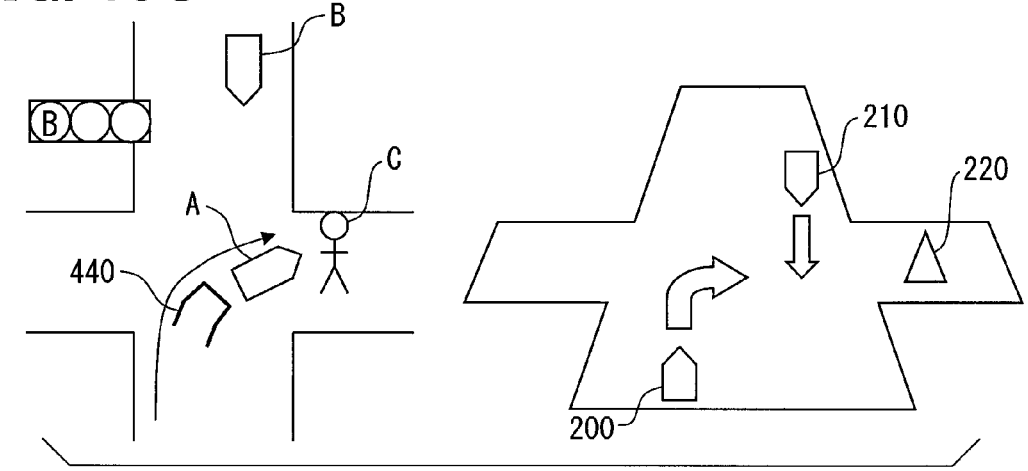

FIGS. 19A to 19C are diagrams illustrating a change in intersection map of the fourth embodiment. FIG. 19A illustrates that the own vehicle "A" is located before the intersection (more specifically, just in front of the stop line), as shown in the left drawing part. Since the own vehicle in FIG. 19A is position outside the intersection, step 13-1 is NO and step 15-1 is YES regardless of whether the own vehicle "A" is stopping or traveling. Accordingly, the display mode becomes the intersection target up display.

The left drawing part of FIG. 19A shows a situation where the own vehicle "A" is stopped at a point before the right turn wait point 440, as shown in the left drawing part. In this case, step S13-1 is YES and the process proceeds to step S14. Therefore, the intersection map is displayed in the heading up display, as shown in the right drawing part of FIG. 19B.

The left drawing part of FIG. 19C shows a situation where the own vehicle "A" has not stopped at the right turn wait point 440 and has passed the right turn wait point 440. In this case, the step S13-1 is NO. Accordingly, even when the own vehicle "A" has passed the right turn wait point 440, the intersection target up display is maintained, as shown in the right drawing part of FIG. 19C.

When the own vehicle "A" is stopped in the intersection, it is estimated that the driver of the own vehicle "A" is paying attention to an on-coming vehicle approaching the intersection. From this viewpoint, in the fourth embodiment, when the own vehicle "A" is stopped in the intersection before reaching the right turn wait point 440, the display mode is switched from the intersection target up display to the heading up display. Because of this, it becomes easier to recognize the presence of the obstacle on a far side of the in-coming lane. The obstacle on a far side of the in-coming lane is an obstacle to which the attention should be paid next. When the own vehicle "A" is not stopped at a point before the right turn wait point in the intersection (S13-1: NO), and when the on-coming vehicle is present (S15-1: YES), the display mode is maintained at the intersection target up display until the own vehicle passes the on-coming lane even if the position of the own vehicle "A" goes beyond the wait point node. This facilitates recognition of the presence of the on-coming vehicle.

Fifth Embodiment

Figure 20:
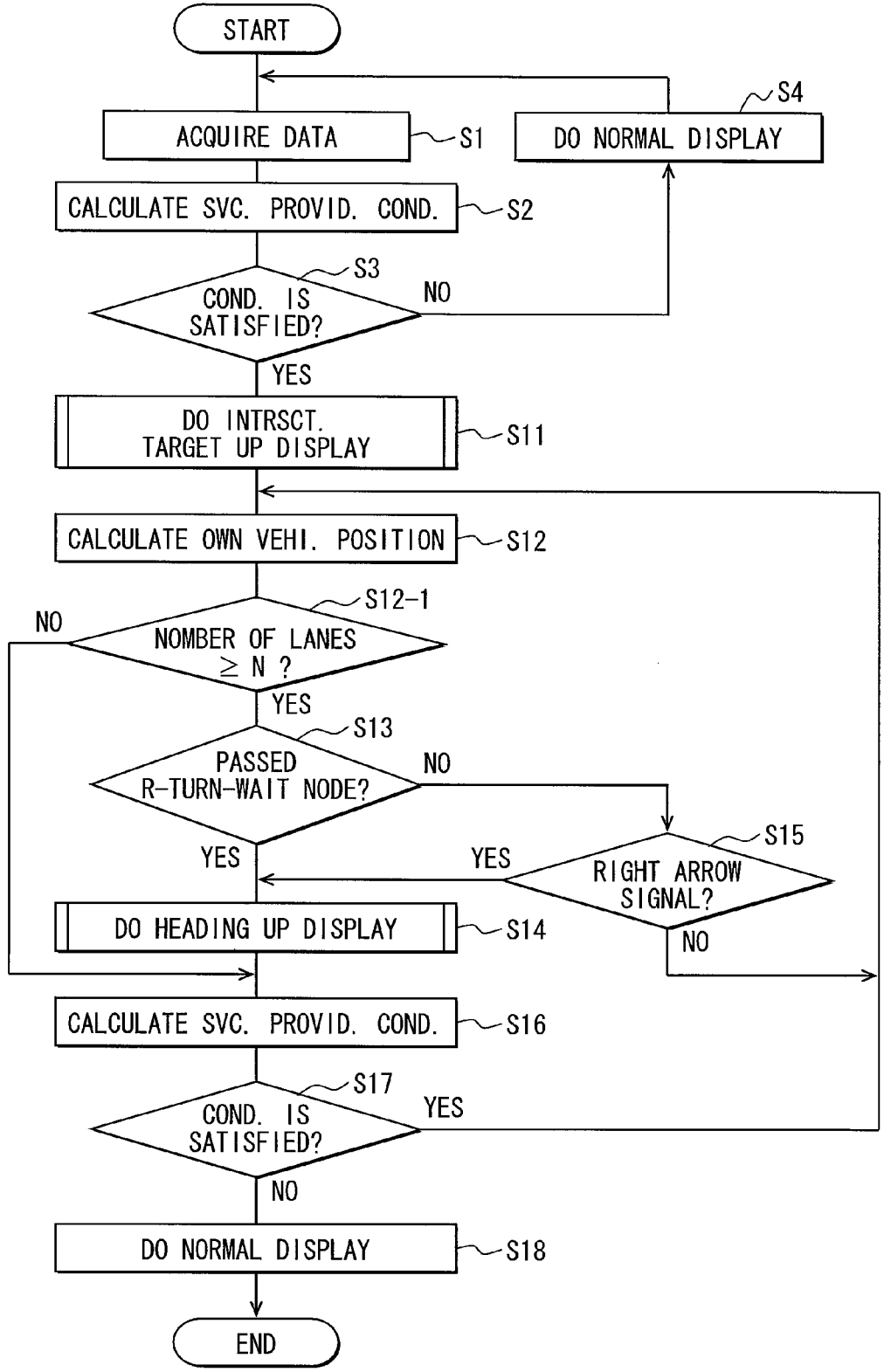
FIG. 20 is a flowchart illustrating a process performed by a computation device 170 in a fifth embodiment.

A fifth embodiment will be described below. The fifth embodiment is also substantially the same as the first embodiment in mechanical configuration. FIG. 20 is a flowchart illustrating a process performed by the computation device 170 in the fifth embodiment. The flowchart of FIG. 20 differs from the flowchart of FIG. 13 in that step S12-1 is added between step S12 and step S13.

In step S12-1, it is determined whether or not the number of lanes of the road on which the own vehicle is traveling is greater than or equal to a preset value N. The value N is set to a numeric value (e.g., 3) which indicates that the intersection is large. The number of lanes and the value N correspond to an intersection size value and a reference size value, respectively.

The determination in step S12-1 uses information on the number of lanes included in the road shape line information, which is transmitted from the road side wireless apparatus 10. When this determination results in YES, the process returns to step S13. When this determination results in NO, the process proceeds to step S16. That is, when the number of lanes of the traveling road is less than N, the display is maintained at the intersection target up display without being switched into the heading up display.

The intersection target up display is the display mode, in which after the own vehicle "A" passes the in-intersection right turn wait node 410c and changes the heading direction, the upper direction of the intersection map is no longer the heading direction of the own vehicle. In the case of a large intersection, if the intersection target up display is assumed to be maintained after passage of the own vehicle "A" through the in-intersection right turn wait node 410c and the change in heading direction, the upper direction of the intersection map differs from the heading direction of the own vehicle for a relatively long time, and as a result, the driver may feel a sense of discomfort. From this viewpoint, according to the fifth embodiment, when the number of lanes greater than or equal to N, steps S13 and S15 are performed to determine whether to switch the display into the intersection target up display or the heading up display. In the case of a small intersection, if the display mode is assumed to be switched, the changed displayed mode is maintained for a short time. The change of display mode only for the short time would cause the driver to have a sense of discomfort. For this viewpoint, when the number of lanes is less than N, steps S13 and S15 are prohibited from being performed, so that the change in display mode is prohibited.

Sixth Embodiment

A sixth embodiment will be described below. In the sixth embodiment, depending on the distance to the intersection, the display form of the map is changed between a two-dimensional display form (referred to herein as a two-dimensional map) and a three-dimensional display form (referred to herein as a three-dimensional map).

The two-dimensional map refers to a map that has the same scale in the lower-to-upper direction and the left-to-right direction. The three-dimensional map refers to a map that has a smaller scale at a portion closer to the top of the screen. The above-illustrated map corresponds to the three-dimensional map.

Figure 21:
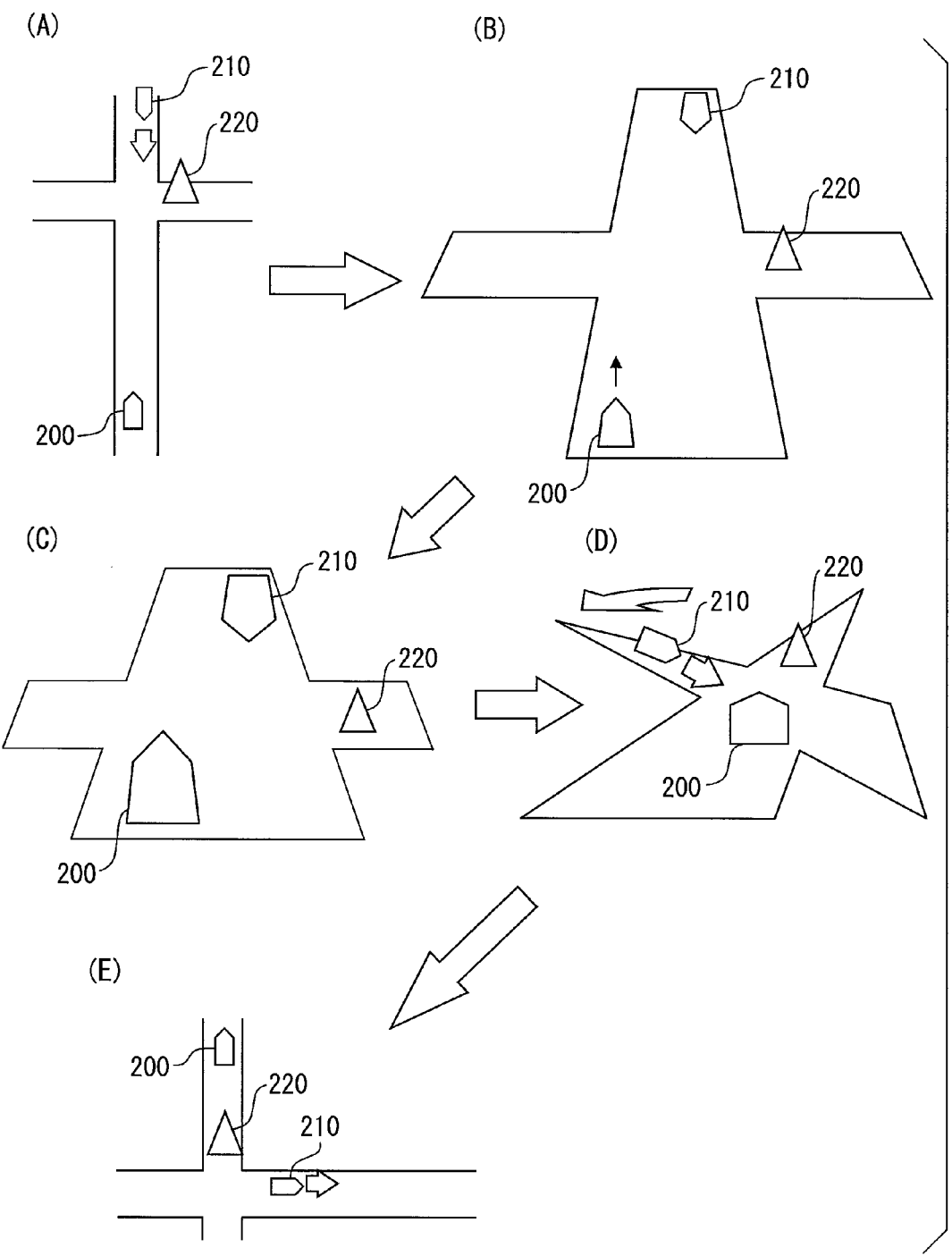
FIG. 21 is a diagram illustrating an intersection map change in a sixth embodiment.

FIG. 21 is a diagram illustrating a change in intersection map of the sixth embodiment. The intersection map is changed in an order of display (A) to (E). In each display (A) to (E) of FIG. 21, the own vehicle mark 200, the on-coming vehicle mark 210, and the after-right-turn obstacle mark 220 are depicted.

The display (A) of FIG. 21 is a display form when the distance from the own vehicle "A" to the center of the intersection is larger than a preset three-dimensional-display distance. In the display (A) of FIG. 21, the intersection map is the two-dimensional map and is displayed in the intersection target up display mode, in which the heading direction of the own vehicle just before the entry into the intersection points to the top of the screen is.

When the own vehicle "A" travels and when the distance to the center of the intersection decreases blow the three-dimensional-display distance, the display is switched into the three-dimensional map, as shown in the display (B) of FIG. 21. This display (B) is the same as the right drawing part of FIG. 10A. In the display (B), the sizes of the own vehicle mark 200 and the on-coming vehicle mark 210 indicate the relative distance therebetween. As illustrated in the display (C), as the own vehicle "A" and the on-coming vehicle "B" approach the intersection, the own vehicle mark 200 and the on-coming vehicle mark 210 are displayed with larger sizes gradually. Thereafter, one of the determinations of the foregoing embodiments may conclude that the display mode should be switched into the heading up display, and as a result, the intersection map is displayed in the heading up display as shown in the display (D). Thereafter, when the own vehicle "A" further travels and when the distance to the center of the intersection exceeds the three-dimensional-display distance again, the intersection map returns to the two-dimensional map, as shown in the display (E).

The three-dimensional-display distance for starting displaying the three-dimensional map is a distance in the assist service area. However, a point at which the display of the two-dimensional map starts may not be inside the assist service area. Since the intersection map cannot be acquired from the road side wireless apparatus 10 when the own vehicle is out of the assist service area, the intersection map to be displayed is acquired from other apparatuses such as a navigation apparatus or the like.

In the sixth embodiment, when the own vehicle is near the intersection, the intersection map is displayed as the three-dimensional map, which is the display form similar to an actual landscape. Therefore, the obstacle n the intersection-surrounding area can be more easily recognized from the intersection map. Additionally, when the own vehicle is distant from the intersection, the intersection map is displayed as the two-dimensional map. Therefore, a distance from the own-vehicle to a distant point can be easily recognized.

Embodiments of the present invention are not limited to the above-described embodiment and include the below-described embodiments. Furthermore, embodiments can be modified in various ways without departing from the scope.

For example, even when a map reflecting an actual intersection shape is used for the intersection map, the road map data may not be used. The shape of the intersection ahead of the own vehicle may be determined from a vehicle swept path. Based on the determined shape of the intersection map, an intersection map may be created and displayed in the intersection target up display mode. Details will be given with reference to FIGS. 11A and 11B.

Figure 11A:
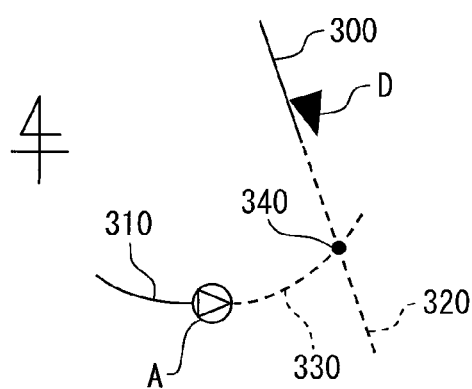
FIGS. 11A and 11B are diagrams illustrating creation and display of an intersection map in an intersection target up display mode by inter-vehicle communications.
Figure 11B:
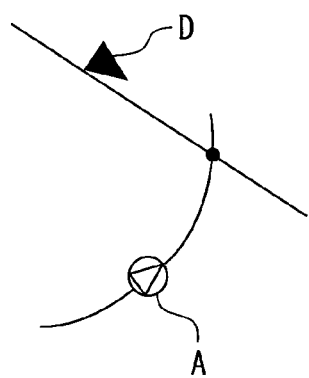

By the inter-vehicle communications, the computation device 160 successively acquires position of another vehicle "D" and determines a vehicle swept path 300 of the vehicle "D" (FIG. 11A). A vehicle swept path 310 of the own vehicle "A" is also determined. An estimated future swept path 320 of the vehicle D and an estimated future swept path 330 of the own vehicle A can be obtained by extending the vehicle swept paths 300, 310 while keeping the same radiuses of curvature. Thereafter, a point of intersection between the two estimated swept paths 320, 330 is set as an intersection 340 ahead of the own vehicle. The intersection map is created by using the shape of the intersection 340 and the shapes of the estimated swept paths 320, 330 around the intersection 340. The intersection map is rotated so that a portion of the estimated swept path 330 of the own vehicle around the intersection 340 extends in the lower-to-upper direction of the screen, as illustrated in FIG. 11B. FIG. 11B illustrates the intersection map in the intersection target up display. By determining the shape of the intersection map and the upper direction of the intersection map without use of the road map data, it is possible to display the intersection map even if the road map display cannot be acquired. In the cases of FIGS. 11A, 11B, the computation device 160 acts as a road shape determination section and a road shape determination means. A way of creating the estimated swept path 320, 330 is not limited to extending the vehicle swept path 300, 310 while keeping the same radius of curvature. A direction of tangent to the vehicle swept path 300, 310 at the present time may be used as an estimated swept path 320, 330.

Alternatively, even if the assist service providing condition is satisfied, step S4 may be performed and the display may be switched into the normal display, provided that the following situation arises. Before the own vehicle passes the intersection, the traffic signal of the own-vehicle-traveling road is switched into a passage-prohibit color (e.g., red signal). When the traffic signal in the heading direction is switched into a red signal, the own vehicle normally stops traveling. Thus, the need of notification of the obstacle is reduced. It is conceivable that when stopping at the red signal, many drivers would like to check the screen that was provided before the displaying of the intersection map. In this case, when the traffic signal is switched into a green signal, the intersection map is displayed again in the display mode determined in steps S5, S6 or S8.

In the foregoing embodiments, the intersection target up display is used as a display mode in which the upper direction is fixed. Alternatively, the north up display may be used as the display mode in which the upper direction is fixed.

In the foregoing embodiments, although the obstacle information is notified when the own vehicle makes a right turn, the obstacle information may be notified when the own vehicle makes a left turn. In place of the road side camera 20, a radar such as a millimeter wave radio may be used to detect an object.

In the fifth embodiment, the number of lanes is used as the intersection size value. Alternatively, a distance from the in-intersection right turn wait node 410c to the pedestrian crossing start node 410e or to the pedestrian crossing end node 410f may be used as the intersection size value.

In the second embodiment, even when the own vehicle "A" has not passed the in-intersection right turn wait node, the display mode is switched into the heading up display mode in response to the emergence of the right arrow signal. Alternatively, in place of the determination whether or not the own vehicle "A" has passed the in-intersection right turn wait node, it may be determined whether or not the on-coming vehicle is present. That is, even when the on-coming vehicle is present, the display mode may be switched into the heading up display mode in response to the emergence of the right arrow signal.

The node target up display used in the foregoing embodiments may be replaced with the heading up display. Reversely, the heading up display may be replaced with the node target up display.

In the above embodiments and accompanying drawings, reference 1 refers to a driving assistance system, and reference 10 refers to a road side wireless apparatus. References 20, 30, 40, 50, and 100 refer to a road side camera, a light beacon, a traffic signal lamp controller, a road side controller, and an n-vehicle apparatus, respectively. The in-vehicle apparatus corresponds to an obstacle information notification apparatus mounted to an own vehicle. References 110, 120, 130, and 140 refer to a vehicle speed sensor, a speaker, a display device, and an in-vehicle wirelesses device, respectively. The in-vehicle wirelesses device 140 corresponds to a road line shape information acquisition section, an road line shape information acquisition means, an on-coming vehicle information acquisition section, and an on-coming vehicle information acquisition means. References 150, 160, and 170 refer to a light beacon antenna, an in-vehicle LAN, and a computation device, respectively. The computation device 170 corresponds to a map display control section, a map display control means, a road shape determination section, and a road shape determination means. Reference 200 refers to an own vehicle mark. Reference 210 refers to an on-coming vehicle mark. The on-coming vehicle mark is one example of obstacle mark. References 220, 300, 310, 320, 330, and 340 refer to an after-right-turn obstacle mark, a swept path of a difference vehicle "D", a swept path of an own vehicle "A", an estimated swept path of the difference vehicle "D", and an estimated swept path of the own vehicle "A", respectively. References "A", "B", and "C" refer to the own vehicle, the on-coming vehicle, and the pedestrian, respectively.

The present disclosure has various aspects. For example, according to one aspect of the present disclosure, there is provided an obstacle information notification apparatus mounted to an own vehicle, which comprises a display section and a determination section. The display section displays an intersection map on a screen and superimposes a movable body mark on the intersection map when the own vehicle is located within an intersection-surrounding area, the intersection-surrounding area containing an intersection, the intersection map being a map of the intersection. The display section is capable of displaying the intersection map in a first mode and a second mode. In the first mode, an upper direction of the map in the screen is fixed to a given direction, the given direction being determined before the entry into the intersection. In the second mode, the upper direction of the map in the screen is determined based on own vehicle direction information and is changed when the own vehicle make a turn at the intersection. Based on information on a movable body in the intersection-surrounding area, the determination section determines whether to set the first mode or the second mode as a display mode of the intersection map on the screen of the display section.

According to the above obstacle information notification apparatus mounted to the own vehicle, since the display mode of the intersection map switches in the first mode or the second mode depending on the information on the movable body in the intersection-surrounding area, the intersection map is displayed in an easy-to-understand display form according to actual situations. As a result, it becomes easier to recognize the obstacle.

The second mode may be a heading-up display mode, in which the upper direction of the map in the screen is changed so that a heading direction of the own vehicle, which is indicated by the own vehicle direction information, points the top of the screen.

The movable body in the intersection-surrounding area may include an on-coming vehicle approaching the intersection in opposite to the heading direction of the own vehicle, an obstacle in an intersection exit road, and the like. The own vehicle may be also included in the movable body. In order to acquire information on the presence of the obstacle other than the own vehicle, the above obstacle information notification apparatus may further include a movable body information acquisition section that acquires the information on the movable body in the intersection-surrounding area. Based on the information on the movable body acquired by the movable body information acquisition section, the determination section may determine the display mode.

Alternatively, in cases where position of the own vehicle is used as the information on the movable body, the obstacle information notification apparatus may further comprises an own vehicle position calculation section that calculates position of the own vehicle in the intersection-surrounding area. The determination section may determine the display mode by using the position of the own vehicle as the information on the movable body.

The obstacle information notification apparatus may notify a presence of an obstacle around the intersection when the own vehicle gets across an on-coming lane in the intersection to enter an intersecting road. Additionally, the movable body information acquisition section may acquire information on an on-coming vehicle, which enters the intersection from the on-coming lane, and information on an on-coming-lane-after-passage obstacle, which is the obstacle existing in a pedestrian crossing that the own vehicle is to pass after getting across the on-coming lane. When the on-coming vehicle is present in the heading direction of the own vehicle, the determination section determines that the display mode be set to the first mode. When the on-coming-lane-after-passage obstacle is present, the determination section determines that the display mode be set to the second mode.

The on-coming vehicle is a vehicle that travels in the on-coming lane toward the intersection. Thus, a driver of the own vehicle entering the intersection can recognize a direction of the own vehicle without looking map display. Therefore, by fixing the upper direction on the display based on the presence of the on-coming vehicle in the heading direction, it becomes possible to suppress an unneeded map rotation and facilitate recognition of the on-coming vehicle.

During the running of the own-vehicle in the intersection-surrounding area, a direction of the on-coming-lane-after-passage obstacle (e.g., a pedestrian existing in or around a pedestrian crossing on a far side of the on-coming lane from the own vehicle) relative to the own vehicle changes to a large extent. For example, at the beginning of the entry of the own vehicle into the intersection-surrounding area, the on-coming-lane-after-passage obstacle is present diagonally frontward of the own vehicle. When the own vehicle heads in the intersection exit road by getting across the on-coming lane, there is a large change in the direction of the on-coming-lane-after-passage obstacle relative to the own vehicle. Therefore, the determination section sets the display mode to the second mode based on the presence of the-on-coming lane-after-passage obstacle, thereby facilitating recognition of the presence of the on-coming lane-after-passage obstacle in a future path.

The obstacle information notification apparatus may be configured in the following way. The determination section determines to set the first mode when the on-coming-lane-after-passage obstacle is present and the on-coming vehicle is present in the heading direction of the own vehicle. According to this configuration, when both of the on-coming-lane-after-passage obstacle and the on-coming vehicle are present, the display mode is the first mode until the own vehicle turns at the intersection. Since the display mode is the first mode during a period requiring attention to the on-coming vehicle, recognition of the on-coming vehicle is facilitated. Moreover, when the own vehicle turns at the intersection and heads in the intersection exit road, the display mode is switched into the second mode. This facilitates the recognition of the on-coming-lane-after-passage obstacle in the heading direction.

The above obstacle information notification apparatus may notify a presence of an obstacle around the intersection when the own vehicle gets across an on-coming lane in the intersection to enter an intersecting road. Until the position of the own vehicle calculated by the own vehicle position calculation section reaches a point at which the own vehicle has got across the on-coming lane, the determination section maintain the first mode as the display mode. After the position of the own vehicle reaches the point at which the own vehicle has got across the on-coming lane, the determination section sets the display mode to the second mode.

According to the above, since the display mode is the first mode while the attention should be paid to the on-coming vehicle, the recognition of the on-coming vehicle is facilitated. Moreover, when the own vehicle enters the intersecting road by getting across the on-coming lane, the display mode is switched into the second mode. This facilitates the recognition of the on-coming-lane-after-passage obstacle in the heading direction.

The above obstacle information notification apparatus may further comprises a map display control section that causes the display section to display the intersection map in the display mode determined by the determination section.

In the above obstacle information notification apparatus, the first mode may be an intersection target up display mode, in which the upper direction on the screen is the heading direction of the own vehicle just before entry into the intersection. When the intersection map is displayed in the intersection target up display mode, the heading direction at a time before entry into the intersection is used for the upper direction on the screen even when the road to the interaction is curved or the own vehicle does not travel northward. Therefore, it becomes possible to recognize the on-coming vehicle, which is approaching the intersection in a direction opposite to the heading direction of the own vehicle.

The above obstacle information notification apparatus may further comprise an intersection shape acquisition section that acquires an intersection shape from a road side apparatus. Based on the intersection shape acquired from the intersection shape acquisition section, the map display control section may create the intersection map and display the intersection map with the display section. A typical road side apparatus successively transmit a shape of the intersection equipped with this road side apparatus. Therefore, the above obstacle information notification apparatus can efficiently use the shape of the intersection successively transmitted from the road side apparatus.

When a traffic signal in the heading direction switches into a red signal, the own vehicle normally stops traveling, and the need to notify the presence of the obstacle is typically reduced. Additionally, it is conceivable that upon stopping at the red signal, the driver would like to check the screen that was provided before the displaying of the intersection map. In view of this, the above obstacle information notification apparatus may be configured in the following way. The display control section displays the intersection map in the display mode determined by the determination section. When a traffic signal located in the heading direction switches into a stop signal while the own vehicle is being in the intersection-surrounding area, the display control section returns the display of the display section back to the display that was provided before the entry into the intersection. Thereafter, when the traffic signal switches into a passage allowance signal, the display control section displays again the intersection map in the display mode determined by the determination section.

According to the above obstacle information notification apparatus, since the display control section displays again the intersection map in the display mode determined by the determination section in response to the change of the traffic signal into the passage allowance signal, the obstacle can be recognized from the intersection map after the traffic signal switches into green.

The information on the on-coming vehicle may be acquired from a road side apparatus, or alternatively acquired by inter-vehicle combinations. By inter-vehicle communication, on-coming vehicle information can be displayed as the obstacle mark on the intersection map even the road side wireless apparatus is not installed at the intersection.

The above obstacle information notification apparatus may further comprises a road shape determination section. The road shape determination section determines a shape of an estimated future swept path of a different vehicle based on a vehicle swept path of the different vehicle acquired by inter-vehicle communications, and determine a shape of an estimated future swept path of the own vehicle based on a vehicle swept path of the own vehicle. The road shape determination section further determine a shape of the intersection existing in the heading direction of the own vehicle based on the shape of the estimated future swept path of the different vehicle and the shape of the estimated future swept path of the own vehicle. The map display control section determines a shape of the intersection map based on the shape of the intersection determined by the road shape determination section. The map display control section further determines the upper direction of the intersection map in the intersection target up display mode based on the shape of the estimated future swept path of the own vehicle determined by the road shape determination section.

Since the above way for determining the shape and upper direction of the intersection map does not use a road map data, the intersection can be displayed even when the road map data cannot be acquired from vehicle external apparatuses such as the road side apparatus or vehicle internal apparatuses such as a navigation apparatus.

The obstacle information notification apparatus may be configured in the following way. As a distance between the own vehicle and the obstacle, which is displayed as an obstacle mark on the intersection map, becomes smaller, the map display control section displays the intersection map with a larger scale. Additionally, the map display control section displays an own vehicle mark and the obstacle mark with sizes according to the scale of the intersection map. Because of this, the distance between the own vehicle and the obstacle can be recognized from the scale of the intersection map and the sizes of the own vehicle mark and the obstacle mark.

The above obstacle information notification apparatus may notify a presence of an obstacle around the intersection when the own vehicle gets across an on-coming lane in the intersection to enter an intersecting road. When the determination section determines to set the display mode to the first mode based on the information on the movable body in the intersection-surrounding area and thereafter a traffic signal in the heading direction of the own vehicle switches in an arrow signal indicative of permission to get across the on-coming lane to enter the intersecting road, the determination section determines to set the display mode to the second mode.

When the traffic signal is the arrow signal permitting to get across the on-coming lane to enter the intersecting road, a vehicle is unlikely to enter from the on-coming lane into the intersection. Therefore, when the display mode is switched into the second mode in response to the change of the traffic signal into the arrow signal, it become easier to recognize the obstacle on a far side of the on-coming lane from the own vehicle.

The above obstacle information notification apparatus, which notifies a presence of an obstacle around the intersection when the own vehicle gets across an on-coming lane in the intersection to enter an intersecting road, may be configured in the following way. The first mode is an intersection target up display mode in which a heading direction of the own vehicle just before entry into the intersection is used for the upper direction on the screen. The obstacle information notification apparatus may further comprises a road line shape information acquisition section that acquires road line shape information, which includes nodes, links and node attributes of roads that form the intersection. When the own vehicle passes a display switch node, the determination section switches the display mode from the first mode to the second mode. The display switch node is one of the nodes between a wait point node and an after-on-coming-lane node. The wait point node is located at a point before the on-coming lane in the intersection. The after-on-coming-lane node is located after the on-coming lane.

According to the above, until the position of the own vehicle reaches the display switch node, the intersection map is displayed in the intersection target up display mode to facilitate the recognition of the on-coming vehicle. When the own vehicle reaches the display switch node and then the pedestrian crossing of the intersecting road is present in the heading direction, the intersection map is displayed in the second mode to facilitate the recognition of the intersecting road and the obstacle on a far side of the on-coming lane.

The above obstacle information notification apparatus may be configured in the following way. The second mode is a node target up display mode, in which the upper direction on the screen is a direction from one of two nodes to the other of the two nodes. The two nodes are two of the nodes acquired by the road line shape information acquisition section. The one node is located on or after the display switch node and the other node is located after the first node in the heading direction.

The own vehicle typically travels in the intersection by passing near nodes. Therefore, by determining the upper direction on the screen from a direction between nodes, it is possible to change the upper direction of the intersection map on the screen in response to a own vehicle direction change even when the own vehicle is not equipped with a sensor that detects a vehicle direction.

The obstacle information notification apparatus may be configured in the following way. In response to passage of the own vehicle through the display switch point, the display mode is switched into the node target up display mode in which the upper direction on the screen is a direction from a pedestrian crossing start node to a pedestrian crossing end node.

At the time of the passage through the display switch point, the vehicle does not head in the direction of the intersection exit road yet. At this time, the obstacle information notification apparatus displays the intersection map so that the pedestrian crossing of the intersection exit road is displayed in the vicinity of the top of the screen. Therefore, the recognition of the obstacle in the pedestrian crossing is facilitated.

The above obstacle information notification apparatus, which notifies a presence of an obstacle around the intersection when the own vehicle gets across an on-coming lane in the intersection to enter an intersecting road, may be configured in the following way. The first mode is an intersection target up display mode in which a heading direction of the own vehicle just before entry into the intersection is used for the upper direction on the screen. The above obstacle information notification apparatus may further comprises a road line shape information acquisition section and an on-coming vehicle information acquisition section. The road line shape information acquisition section acquires road line shape information which includes nodes, links and node attributes of roads that form the intersection. The on-coming vehicle information acquisition section acquires information on an on-coming vehicle, which approaches the intersection from the on-coming lane. When the own vehicle stops in front of a wait point node in the intersection, the determination section determines to switch the display mode from the first mode to the second mode. Even when the own vehicle passes the wait point node without stopping in front of the wait point node in the intersection, the determination section determines to maintain the first mode as long as the on-coming vehicle is present. The wait point node is located at a point before the one vehicle passes the on-coming lane.

It is considered that when the own vehicle stops in the intersection, the driver of the own vehicle is paying attention to an on-coming vehicle approaching the intersection. When the own vehicle stops in front of a wait point node in the intersection, the determination section determines to switch the display mode from the first mode to the second mode to facilitate the recognition of the obstacle on an opposite side of the on-coming lane from the own vehicle. The obstacle on the opposite side is an obstacle to which the attention should be paid next. Even when the own vehicle passes the wait point node without stopping in front of the wait point node in the intersection, as long as the on-coming vehicle is present, the determination section determines to maintain the first mode to facilitate the recognition of the on-coming vehicle.

The obstacle information notification apparatus may be configured in the following way. When the own vehicle is located within a preset three-dimensional display distance from the intersection, the determination section determines to display the intersection map in a three-dimensional display form in which scale is smaller at an upper portion of the screen. When the own vehicle is located out of the preset three-dimensional display distance from the intersection, the determination section determines to display the intersection map in a two-dimensional display form in which the scale is the same in a lower-to-upper direction and a left-to-right direction of the screen.

According to the above configuration, when the own vehicle is near the intersection, the intersection map is displayed in the three-dimensional display form, which is the display form that looks like an actual landscape. Therefore, the obstacle existing in the intersection-surrounding area can be more easily recognized from the intersection map. When the own vehicle is far from the intersection, the intersection map is displayed in the two-dimensional display form, in which the scale is the same in the lower-to-upper direction and the left-to-right direction of the screen. Therefore, the distance from the own vehicle to a far place can be easily recognized.

The obstacle information notification apparatus may be configured in the following way. When an intersection size value indicative of size of the intersection is greater than or equal to a reference size value, the determination section determines whether to set the first mode or the second mode as the display mode based on the information on the movable body. When the intersection size value is smaller than or equal to the reference size value, the determination section determines to set the first mode as the display mode of the intersection without determining whether to set the first mode or the second mode as the display mode.

In the intersection target up display (first mode), after the own vehicle passes the wait point node and changes its heading direction, the upper direction of the intersection map is no longer the heading direction of the own vehicle. In the case of a large intersection, if the intersection target up display were maintained even after passage of the own vehicle through the wait point node and the change in heading direction, the upper direction of the intersection map would not be the heading direction of the own vehicle for a relatively long time, and as a result, the driver would feel a sense of discomfort. From this viewpoint, when the intersection size value is greater than or equal to the reference size value, the determination section is allowed to determine whether to set the first mode or the second mode. In the case of a small intersection, if the display mode were switched, the changed displayed mode would be maintained for a short time. The change of display mode only for the short time would cause the driver to have a sense of discomfort. For this viewpoint, when the intersection size value is smaller than or equal to the reference size value, the display mode is prohibited from being switched.

It should be noted that embodiments, configurations, aspects etc. of the present disclosure are not limited to the above respective ones. Embodiments, configurations, aspects etc. obtained by combining technical parts disclosed in different embodiments, configurations, aspects etc. are also within the scope of the present disclosure.

What is claimed is:

1. An obstacle information notification apparatus mounted to an own vehicle, comprising:
   a display section;
   a determination section; and
   a movable body information acquisition section that acquires the information the movable body in the intersection-surrounding area,
   wherein:
   the display section displays an intersection map on a screen and superimposes a movable body mark on the intersection map when the own vehicle is located within an intersection-surrounding area, the intersection-surrounding area containing an intersection, the intersection map being a map of the intersection;

the display section is configured to display the intersection map in
  a first mode in which an upper direction of the map on the screen is always fixed to a given direction even when a heading direction of the own vehicle is changed, the given direction being determined before the entry into the intersection, and
  a second mode in which the upper direction of the map on the screen is rotated when the heading direction of the own vehicle is changed;
the intersection map in both the first mode and the second mode displays an obstacle mark thereon thr notification of a presence of an obstacle; and
based on information on a movable body in the intersection-surrounding area, the determination section determines whether to set the first mode or the second mode as a display mode of the intersection map on the screen of the display section,
based on the information on the movable body acquired by the movable body information acquisition section, the determination section determines the display mode;
when the own vehicle gets across an on-coming lane in the intersection to enter an intersecting road, the obstacle information notification apparatus mounted to the own vehicle notifies the presence of the obstacle around the intersection;
the movable body information acquisition section acquires
  information on an on-coming vehicle, which approaches the intersection from the on-coming lane; and
  information on an on-coming-lane-after-passage obstacle, is the obstacle existing in a pedestrian crossing which the own vehicle is to pass after getting across the on-coming lane; and
when the on-coming vehicle is present in the heading direction of the own vehicle, the determination section determines that the display mode be set to the first mode; and
when the on-coming-lane-after-passage obstacle is present, the determination section determines that the display mode be set to the second mode.

2. The obstacle information notification apparatus according to claim 1, wherein:
the second mode is a heading-up display mode, in which the upper direction of the map on the screen is changed so that a heading direction of the own vehicle, which is indicated by the own vehicle direction information, points the top of the screen.

3. The obstacle information notification apparatus according to claim 1, further comprising:
an own vehicle position calculation section that calculates position of the own vehicle in the intersection-surrounding area,
wherein:
the determination section determines the display mode by using the position of the own vehicle as the information on the movable body.

4. The obstacle information notification apparatus according to claim 3, wherein:
when the own vehicle gets across an on-coming lane in the intersection to enter an intersecting road, the obstacle information notification apparatus mounted to the own vehicle notifies a presence of an obstacle around the intersection; and
the first mode is an intersection target up display mode in which a heading direction of the own vehicle just before the entry into the intersection is used for the upper direction on the screen, the obstacle information notification apparatus further comprising:
  a road line shape information acquisition section that acquires road line shape information, which includes nodes, links and node attributes of roads that form the intersection, wherein:
when the own vehicle passes a display switch node, the determination section switches the display mode from the first mode to the second mode; and
the display switch node is one of the nodes between a wait point node and an after-on-coming-lane node, the wait point node being located before the on-coming lane in the intersection, the after-on-coming-lane node being located after the on-coming lane.

5. The obstacle information notification apparatus according to claim 4, wherein:
the second mode is a node target up display mode, in which the upper direction on the screen is a direction from one of two nodes to the other of the two nodes, the two nodes being two of the nodes acquired by the road line shape information acquisition section; and
the one node is located on or after the display switch node and the other node is located after the first node in the heading direction.

6. The obstacle information notification apparatus according to claim 5, wherein:
in response to passage of the own vehicle through the display switch point, the display mode is switched into the node target up display mode in which the upper direction on the screen is a direction from a pedestrian crossing start node to a pedestrian crossing end node.

7. The obstacle information notification apparatus according to claim 1, wherein:
the determination section determines that the first mode be set as the display mode, when
  the on-coming-lane-after-passage obstacle is present and
  the on-coming vehicle is present in the heading direction of the own vehicle.

8. The obstacle information notification apparatus according to claim 1, further comprising:
a map display control section that causes the display section to display the intersection map in the display mode determined by the determination section.

9. The obstacle information notification apparatus according to claim 8, wherein:
the first mode is an intersection target up display mode, in which the heading direction of the own vehicle just before the entry into the intersection is used for the upper direction on the screen.

10. The obstacle information notification apparatus according to claim 8, further comprising:
an intersection shape acquisition section that acquires an intersection shape from a road side apparatus, wherein:
based on the intersection shape acquired from the intersection shape acquisition section, the map display control section creates the intersection map and displays the intersection map with the display section.

11. The obstacle information notification apparatus according to claim 8, wherein:
as a distance between the own vehicle and the obstacle, which is displayed as an obstacle mark on the intersection map, becomes smaller, the map display control section displays the intersection map with a larger scale while displaying an own vehicle mark and the obstacle mark with sizes according to the scale of the intersection map.

12. The obstacle information notification apparatus according to claim 1, wherein the obstacle information notification apparatus acquires the information on the on-coming vehicle by inter-vehicle communications.

13. The obstacle information notification apparatus according to claim 1, wherein:
when the own vehicle is located within a preset three-dimensional display distance from the intersection, the determination section determines to display the intersection map in a three-dimensional display form, in which scale is smaller at an upper portion of the screen; and
when the own vehicle is not located within the preset three-dimensional display distance from the intersection, the determination section determines to display the intersection map in a two-dimensional display form in which the scale is constant throughout a lower-to-upper direction and a left-to-right direction of the screen.

14. An obstacle information notification apparatus mounted to an own vehicle, comprising:
a display section;
a determination section; and
an own vehicle position calculation section that calculates position of the own vehicle in the intersection-surrounding area,
wherein:
the display section displays an intersection map on a screen and superimposes a movable body mark on the intersection map when the own vehicle is located within an intersection-surrounding area, the intersection-surrounding area containing an intersection, the intersection map being a map of the intersection;
the display section is configured to display the intersection map in
a first mode in which an upper direction of the map on the screen is always fixed to a given direction even when a heading direction of the own vehicle is changed, the given direction being determined before the entry into the intersection, and
a second mode in which the upper direction of the map on the screen is rotated when the heading direction of the own vehicle is changed;
the intersection map in both the first mode and the second mode displays an obstacle mark thereon for notification of a presence of an obstacle;
based on information on a movable body in the intersection-surrounding area, the determination section determines whether to set the first mode or the second mode as a display mode of the intersection map on the screen of the display section;
the determination section determines the display mode by using the position of the own vehicle as the information on the movable body;
when the own vehicle gets across an on-coming lane in the intersection to enter an intersecting road, the obstacle information notification apparatus mounted to the own vehicle notifies a presence of an obstacle around the intersection;
the determination section sets the display mode to the first mode until the position of the own vehicle calculated by the own vehicle position calculation section reaches a point at which the own vehicle has got across the on-coming lane; and
after the position of the own vehicle reaches the point at which the own vehicle has got across the on-coming lane, the determination section sets the display mode to the second mode.

15. An obstacle information notification apparatus mounted to an own vehicle, comprising:
a display section;
a determination section; and
a map display control section that causes the display section to display the intersection map in the display mode determined by the determination section,
wherein:
the display section displays an intersection map on a screen and superimposes a movable body mark on the intersection map when the own vehicle is located within an intersection-surrounding area, the intersection-surrounding area containing an intersection, the intersection map being a map of the intersection;
the display section is configured to display the intersection map in
a first mode in which an upper direction of the map on the screen is always fixed to a given direction even when a heading direction of the own vehicle is changed, the given direction being determined before the entry into the intersection, and
a second ode in which the upper direction of the map on the screen is rotated when the heading direction of the own vehicle is changed;
the intersection map in both the first mode and the second mode displays an obstacle mark thereon for notification of a presence of an obstacle;
based on information on a movable body in the intersection-surrounding area, the determination section determines whether to set the first mode or the second mode as a display mode of the intersection map on the screen of the display section;
the display control section displays the intersection map in the display mode determined by the determination section;
when a traffic signal located in the heading direction switches into a stop signal while the own vehicle is being in the intersection-surrounding area, the display control section returns the display of the display section back to the display that was provided before the entry into the intersection; and
when the traffic signal switches from the stop signal into a passage allowance signal, the display control section displays again the intersection map in the display mode determined by the determination section.

16. An obstacle information notification apparatus mounted to an own vehicle, comprising:
a display section;
a determination section;
a map display control section that causes the display section to display the intersection map in the display mode determined by the determination section; and
a road shape determination section that based on a vehicle swept path of the different vehicle acquired by inter-vehicle communications, determines a shape of an estimated future swept path of a different vehicle, based on a vehicle swept path of the own vehicle, determines a shape of an estimated future swept path of the own vehicle, and determines a shape of the intersection existing in the heading direction of the own vehicle based on the shape of the estimated future swept path of the different vehicle and the shape of the estimated future swept path of the own vehicle,
wherein:
the display section displays an intersection map on a screen and superimposes a movable body mark on the intersection map when the own vehicle is located within an intersection-surrounding area, the intersection-surrounding area containing an intersection, the intersection map being a map of the intersection;
the display section is configured to display the intersection map in
a first mode in which an upper direction of the map on the screen is always fixed to a given direction even when a heading direction of the own vehicle is changed, the given direction being determined before the entry into the intersection, and
a second mode in which the upper direction of the map on the screen is rotated when the heading direction of the own vehicle is changed;
the intersection map in both the first mode and the second mode displays an obstacle mark thereon for notification of a presence of an obstacle;
based on information on a movable body in the intersection-surrounding area, the determination section determines whether to set the first mode or the second mode as a display mode of the intersection map on the screen of the display section;
the first mode is an intersection target up display mode, in which the heading direction of the own vehicle just before the entry into the intersection is used for the upper direction on the screen;
the map display control section determines a shape of the intersection map based on the shape of the intersection determined by the road shape determination section; and
the map display control section determines the upper direction of the intersection map in the intersection target up display mode based on the shape of the estimated future swept path of the own vehicle determined by the road shape determination section.

17. An obstacle information notification apparatus mounted to an own vehicle, comprising:
a display section and a determination section, wherein:
the display section displays an intersection map on a screen and superimposes a movable body mark on the intersection map when the own vehicle is located within an intersection-surrounding area, the intersection-surrounding area containing an intersection, the intersection map being a map of the intersection;
the display section is configured to display the intersection map in
a first mode in which an upper direction of the map on the screen is always fixed to a given direction even when a heading direction of the own vehicle is changed, the given direction being determined before the entry into the intersection, and
a second mode in which the upper direction of the map on the screen is rotated when the heading direction of the own vehicle is changed;
the intersection map in both the first mode and the second mode displays an obstacle mark thereon for notification of a presence of an obstacle;
based on information on a movable body in the intersection-surrounding area, the determination section determines whether to set the first mode or the second mode as a display mode of the intersection map on the screen of the display section;
wherein
when the own vehicle gets across an on-coming lane in the intersection to enter an intersecting road, the obstacle information notification apparatus mounted to the own vehicle notifies a presence of an obstacle around the intersection; and
when the determination section sets the display mode to the first mode based on the information on the movable body in the intersection-surrounding area and thereafter a traffic signal in the heading direction of the own vehicle switches in an arrow signal indicative of permission to get across the on-coming lane to enter the intersecting road, the determination section determines that the display mode be set to the second mode.

18. An obstacle information notification apparatus mounted to an own vehicle, comprising:
a display section;
a determination section; and
an own vehicle position calculation section that calculates position of the own vehicle in the intersection-surrounding area,
wherein
the display section displays an intersection map on a screen and superimposes a movable body mark on the intersection map when the own vehicle is located within an intersection-surrounding area, the intersection-surrounding area containing an intersection, the intersection map being a map of the intersection;
the display section is configured to display the intersection map in
a first mode in which an upper direction of the map on the screen is always fixed to a given direction even when a heading direction of the own vehicle is changed, the given direction being determined before the entry into the intersection, and
a second mode in which the upper direction of the map on the screen is rotated when the heading direction of the own vehicle is changed;
the intersection map in both the first mode and the second mode displays an obstacle mark thereon for notification of a presence of an obstacle;
based on information on a movable body in the intersection-surrounding area, the determination section determines whether to set the first mode or the second mode as a display mode of the intersection map on the screen of the display section;
the determination section determines the display mode by using the position of the own vehicle as the information on the movable body;
when the own vehicle gets across an on-coming lane in the intersection to enter an intersecting road, the obstacle information notification apparatus mounted to the own vehicle notifies a presence of an obstacle around the intersection;
the first mode is an intersection target up display mode in which a heading direction of the own vehicle just before the entry into the intersection is set as the upper direction on the screen, and the obstacle information notification apparatus further comprising:
a road line shape information acquisition section that acquires road line shape information which includes nodes, links and node attributes of roads that form the intersection; and
an on-coming vehicle information acquisition section that acquires information on an on-coming vehicle, which approaches the intersection from the on-coming lane, wherein:
when the own vehicle stops in front of a wait point node in the intersection, the determination section determines to switch the display mode from the first mode to the second mode;
even when the own vehicle passes the wait point node without stopping in front of the wait point node in the intersection, the determination section determines to maintain the first mode as long as the on-coming vehicle is present; and the wait point node is located at a point before the own vehicle passes the on-coming lane.

19. An obstacle information notification apparatus mounted to an own vehicle, comprising:

a display section;

a determination section; and an own vehicle position calculation section that calculates position of the own vehicle in the intersection-surrounding area, wherein:

the display section displays an intersection map on a screen and superimposes a movable body mark on the intersection map when the own vehicle is located within an intersection-surrounding area, the intersection-surrounding area containing an intersection, the intersection map being a map of the intersection;

the display section is configured to display the intersection map in a first mode in which an upper direction of the map on the screen is always fixed to a given direction even when a heading direction of the own vehicle is changed, the given direction being determined before the entry into the intersection, and a second mode in which the upper direction of the map on the screen is rotated when the heading direction of the own vehicle is changed;

the intersection map in both the first mode and the second mode displays an obstacle mark thereon for notification of a presence of an obstacle;

based on information on a movable body in the intersection-surrounding area, the determination section determines whether to set the first mode or the second mode as a display mode of the intersection map on the screen of the display section;

the determination section determines the display mode by using the position of the own vehicle as the information on the movable body;

when the own vehicle gets across an on-coming lane in the intersection to enter an intersecting road, the obstacle information notification apparatus mounted to the own vehicle notifies a presence of an obstacle around the intersection; and the first mode is an intersection target up display mode in which a heading direction of the own vehicle just before the entry into the intersection is used for the upper direction on the screen, the obstacle information notification apparatus further comprising:

a road line shape information acquisition section that acquires road line shape information, which includes nodes, links and node attributes of roads that form the intersection, wherein:

when the own vehicle passes a display switch node, the determination section switches the display mode from the first mode to the second mode;

the display switch node is one of the nodes between a wait point node and an after-on-coming-lane node, the wait point node being located before the on-coming lane in the intersection, the after-on-coming-lane node being located after the on-coming lane;

when an intersection size value, which is indicative of size of the intersection, is greater than or equal to a reference size value, the determination section is permitted to determine whether to set the first mode or the second mode as the display mode based on the information on the movable body; and when the intersection size value is smaller than or equal to the reference size value, the determination section sets the display mode to the first mode while being prohibited from determining whether to set the first mode or the second mode as the display mode.

* * * * *